(12) United States Patent
Zhang et al.

(10) Patent No.: US 9,282,110 B2
(45) Date of Patent: Mar. 8, 2016

(54) CLOUD-ASSISTED THREAT DEFENSE FOR CONNECTED VEHICLES

(71) Applicant: Cisco Technology, Inc., San Jose, CA (US)

(72) Inventors: Tao Zhang, Fort Lee, NJ (US); Helder Antunes, Morgan Hill, CA (US); Siddhartha Aggarwal, Santa Clara, CA (US); Chintankumar Patel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/091,435

(22) Filed: Nov. 27, 2013

(65) Prior Publication Data
US 2015/0150124 A1    May 28, 2015

(51) Int. Cl.
| | | |
|---|---|---|
| *G06F 21/00* | (2013.01) | |
| *H04L 29/06* | (2006.01) | |
| *G06F 21/51* | (2013.01) | |
| *G06F 21/56* | (2013.01) | |
| *H04W 12/12* | (2009.01) | |
| *H04L 29/08* | (2006.01) | |

(52) U.S. Cl.
CPC ............ *H04L 63/1408* (2013.01); *G06F 21/51* (2013.01); *G06F 21/564* (2013.01); *H04L 63/14* (2013.01); *H04L 67/12* (2013.01); *H04W 12/12* (2013.01)

(58) Field of Classification Search
CPC .................................................. H04L 63/1408
See application file for complete search history.

(56) References Cited

U.S. PATENT DOCUMENTS

| | | | |
|---|---|---|---|
| 8,514,825 B1 | 8/2013 | Addepalli et al. | |
| 2004/0172557 A1* | 9/2004 | Nakae et al. | 713/201 |
| 2006/0101516 A1* | 5/2006 | Sudaharan et al. | 726/23 |
| 2008/0104700 A1* | 5/2008 | Fagone et al. | 726/22 |
| 2008/0235103 A1* | 9/2008 | Baccas et al. | 705/26 |
| 2009/0049551 A1* | 2/2009 | Ahn et al. | 726/23 |
| 2011/0047597 A1 | 2/2011 | Mahaffey et al. | |
| 2011/0083011 A1* | 4/2011 | Dicrescenzo | 713/158 |
| 2011/0234427 A1 | 9/2011 | Ingram et al. | |
| 2011/0314546 A1 | 12/2011 | Aziz et al. | |
| 2012/0192275 A1 | 7/2012 | Oliver et al. | |
| 2013/0111547 A1* | 5/2013 | Kraemer | 726/1 |
| 2013/0132286 A1 | 5/2013 | Schaefer et al. | |

(Continued)

OTHER PUBLICATIONS

Jon Oberheide et al.: "Rethinking Antivirus: Executable Analysis in the Network Cloud", USENIX Workshop on Hot Topics in Security (HOTSEC '07), Aug. 31, 2007.

(Continued)

*Primary Examiner* — Lisa Lewis
(74) *Attorney, Agent, or Firm* — Patterson & Sheridan, LLP

(57) ABSTRACT

In an example embodiment herein, there is provided methods and a system for cloud-assisted threat defense for connected vehicles. A vehicle suitably includes an on-board computer system for operating and/or controlling various systems on the vehicle. The on-board computer system suitably operates in connection with or includes an on-board threat defense module for detecting and protecting against malware attacks and other security threats to the vehicle. In an example embodiment, a cloud-based security component or security cloud assists with the detection and protection against security threats and malware attacks to the vehicle while minimizing the processing load and memory requirements for the on-board threat defense module.

18 Claims, 10 Drawing Sheets

(56) References Cited

U.S. PATENT DOCUMENTS

| | | |
|---|---|---|
| 2013/0179056 A1 | 7/2013 | Fukuyama |
| 2013/0212659 A1 | 8/2013 | Maher et al. |
| 2013/0268754 A1* | 10/2013 | BALTES et al. ............. 713/156 |
| 2014/0250531 A1* | 9/2014 | MOELLER et al. ........... 726/23 |
| 2014/0282832 A1* | 9/2014 | Chanoch et al. .................. 726/1 |
| 2014/0373104 A1* | 12/2014 | Gaddam et al. ................... 726/4 |

OTHER PUBLICATIONS

International Search Report for PCT/US2014/067203, Mar. 3, 2015.

* cited by examiner

CLOUD-ASSISTED THREAT DEFENSE FOR CONNECTED VEHICLES

TECHNICAL FIELD

The present disclosure relates generally to protecting connected vehicles against security threats, and more particularly, to cloud-assisted threat defense for connected vehicles.

BACKGROUND

Motor vehicles are increasingly equipped with electronic devices that have sophisticated software applications used in connection with vehicle communication, control, performance, and other vehicle functions. Such electronic devices include in-vehicle infotainment, navigation, telematics, onboard communication gateways, vehicle safety communication and control systems and the like.

As a result, vehicles are confronting increasing security threats as communications with other vehicles, the Internet, and with onboard electronic systems continues to grow rapidly. Security threats or malware may reach a vehicle through many venues or avenues of attack, such as from the Internet, from consumer electronic devices tethered or connected to the vehicle, from other vehicles via vehicle-to-vehicle communications, from roadside networks, from any other physical device physically connected to the vehicle, and the like. A vehicle must continuously detect and thwart such attacks to ensure proper functioning of the vehicle.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Overview

Figure 1:
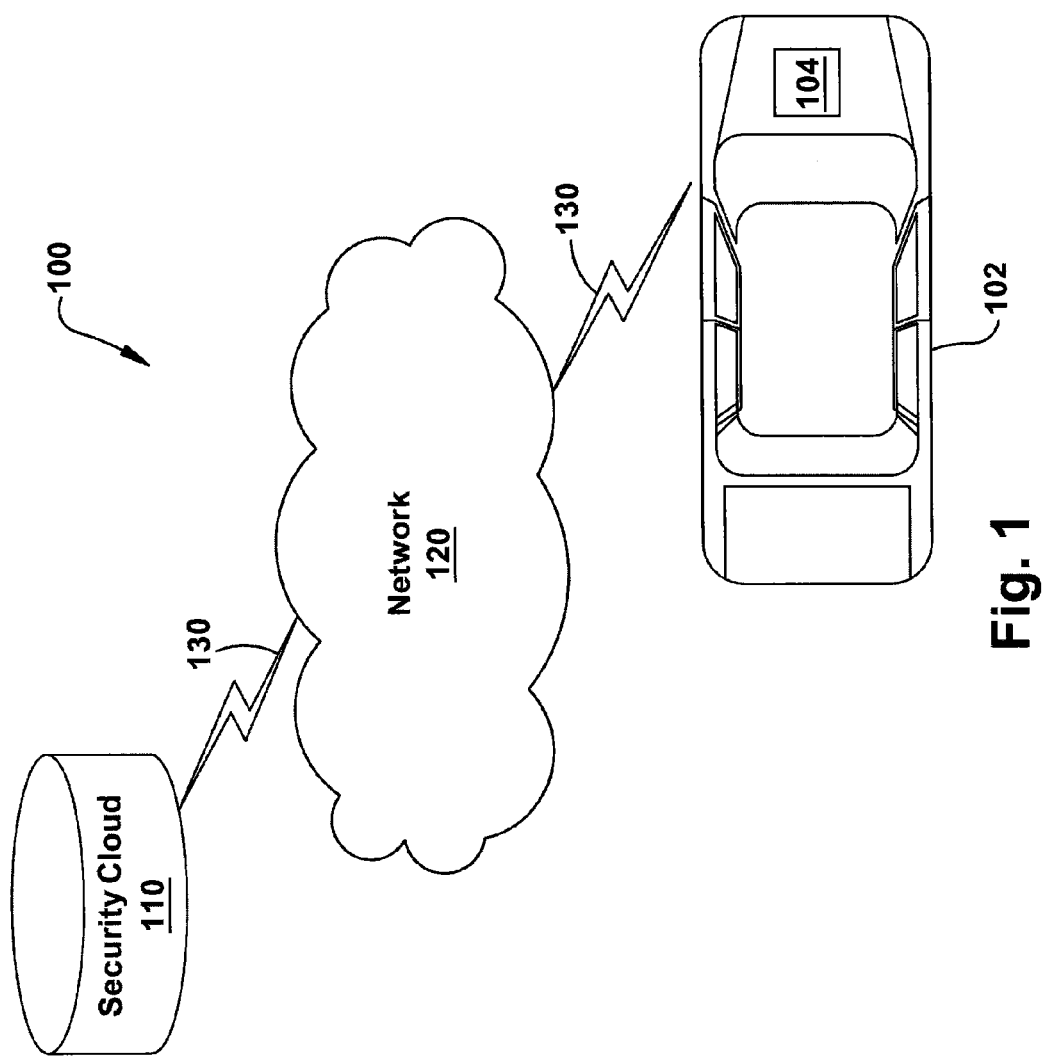
FIG. 1 is a block diagram of an example system for cloud-assisted threat defense.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with embodiments herein, there is disclosed a system and method for cloud-assisted threat defense for connected motor vehicles. Data is received from at least one on-board unit of an associated motor vehicle, at least one source external to the associated motor vehicle, or combinations thereof, wherein the received data includes data representative of at least one file for operation on the associated motor vehicle. A determination is made whether at least one predefined characteristic exists with respect to at least one file identified for operation on the associated motor vehicle. In response to determining that at least one predefined characteristic exists with respect to the at least one file, a determination is made whether the at least one file includes a security threat by analyzing the at least one file based on data representative of security threats stored in memory, and a signal is generated indicating the results of the determination of whether the at least one file includes a security threat.

In accordance with embodiments herein, there is disclosed a system and method for cloud-assisted threat defense for connected vehicles using at least one virtual vehicle. At least one virtual vehicle is configured, wherein each of the virtual vehicles simulates the operation of an actual motor vehicle and is configured to transmit and receive data from at least one external source, wherein the data includes data representative of at least one file identified for operation on an associated motor vehicle. A determination is made whether at least one file received by at least one of the virtual vehicles contains a security threat by analyzing the at least one file based on data representative of security threats stored in memory. A signal is generated indicating the results of the determination of whether the at least one file includes a security threat.

Detailed Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide cloud-assisted threat defense for connected vehicles. In the example embodiment, the cloud-assisted threat defense is provided for security threats against connected motor vehicles. However, it is to be appreciated that the embodiments of the claims herein are not limited in any way to the example embodiment, but rather are to be interpreted to cover cloud-assisted threat defense beyond threats against connected motor vehicles. That is, the embodiments herein can be applied to cloud-assisted threat defense for all types of vehicles, in-vehicle electronic devices, and any other types of resource-constrained devices typically found in machine-to-machine systems.

In an embodiment herein, the vehicle includes an on-board computer system for operating and/or controlling various systems on the vehicle. The on-board computer system operates in connection with or includes an on-board threat defense module for detecting and protecting against malware attacks and other security threats to the vehicle. In an example embodiment, a cloud-based security component or security cloud assists with the detection and protection against security threats and malware attacks to the vehicle while minimizing the processing load and memory requirements for the on-board threat defense module.

In an example embodiment herein, the on-board threat defense module maintains a small local database or databases of threat-related information which is used to scan incoming traffic for security threats. In an example embodiment, the on-board threat defense module dynamically adjusts the size of the local database or databases to balance the amount of local processing and storage by the on-board system versus the volume of traffic between the vehicle and the security cloud for threat protection.

In an example embodiment, the security cloud suitably functions to control access to the vehicle's on-board computer system from other vehicles, networks, devices, and the like that may pose a threat to the vehicle. The security cloud also functions to detect and protect the vehicle from security threats and to maintain the on-board threat defense module capabilities up to date.

In an example embodiment herein, the security cloud employs a virtual machine configured as a virtual vehicle to emulate a physical vehicle for detecting and preventing security attacks. The security cloud uses the virtual vehicle (referred to herein as "Trusted Virtual Vehicle") to detect security threats before such threats reach the vehicle, to distinguish threats that are not relevant to the vehicle, and to determine the trustworthiness of threat reports from the vehicle.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is a schematic diagram illustrating an example architecture or system 100 for cloud-assisted threat defense for vehicles. The system 100 includes at least one vehicle 102 having an on-board computer system 104 for operating and/or controlling various systems, components, or devices included in or associated with the vehicle, such as user devices, machine devices, in-vehicle devices, and the like.

As used herein, the term "user device" is intended to include mobile devices, personal computers, electronic devices, and other devices, components, elements, or objects capable of being operable by a user and capable of initiating voice, audio, media, or data exchanges with the on-board computer system 104. As used herein, the term "machine device" is meant to encompass sensors, actuators, vehicle controllers, including electronic control units (ECU), instruments, embedded devices, media devices, infotainment systems, vehicle navigation systems, displays, other peripheral or auxiliary devices or components, etc. Machine devices may be physically distributed across the vehicle in a vehicle subsystem, consolidated in any way, provisioned in proprietary configurations, or otherwise configured based on particular networking, vehicle, and/or end user needs. The term "in-vehicle device" as used herein, encompasses machine devices and user devices located inside the vehicle.

The system further includes a unified cloud-based security component 110 (referred to hereinafter as a "Security Cloud"). In the illustrated embodiment, the on-board computer system 104 and the Security Cloud 110 are communicatively coupled via a network 120 to facilitate the transfer of information between the on-board computer system 104 and the Security Cloud 110 via suitable communication link 130. The Security Cloud is discussed in detail in connection with FIG. 7.

Although one vehicle 102 having an on-board computer system 104, and one Security Cloud are illustrated in FIG. 1, it is understood by one skilled in the art that any number of vehicles 102, each having an on-board computer system 104, and Security Clouds 110 may be communicatively coupled to the network 120. Furthermore, while only one network 120 is coupled to the on-board computer system 104, and the Security Cloud 110, it will be appreciated by one skilled in the art that any number of networks 120 may be connected to the on-board system 104 and the Security Cloud 110.

The network 120 is a conventional type, wired or wireless, and may have any number of configurations as is known in the art. Furthermore, the network 120 may comprise a local area network (LAN), a wide area network (WAN), wireless local area network (WLAN), wireless wide area network (WWAN), wireless single hop or multi-hop vehicle-to-vehicle network, virtual private network (VPN), Intranet, Extranet, and/or any other appropriate architecture or system that facilitates communications in a network environment. The network 120 may also include any suitable communication link to the on-board computer system 104, and/or the Security Cloud 110 as illustrated by 130. Such communication link 130 includes, but is not limited to, wireless technologies (e.g., IEEE 802.11xm 802.16, WiFi, Bluetooth, WiMax, DSRC, etc.), satellite, cellular technologies (e.g., 3G, 4G, etc.), etc., or any combination thereof. The network 120 may also include configurations capable of transmission control protocol/Internet protocol (TCP/IP) communications, user datagram protocol/Internet protocol (UDP/IP), or any other suitable protocol, where appropriate and based on particular needs. In yet another embodiment, all or some of the links in the network 120 are encrypted using conventional encryption technologies such as secure socket layer (SSL), secure HTTP, and/or virtual private networks (VPN).

The vehicle 102 may be a mobile land vehicle (such as a motorcycle, car, truck, recreational vehicle, or the like), a water vehicle (such as a boat), or an air vehicle (such as an airplane, helicopter, or the like). The vehicle 102 is equipped with suitable hardware and software that enables it to communicate (e.g., transmit and/or receive voice and data communications) over the communication link 130.

Figure 2:
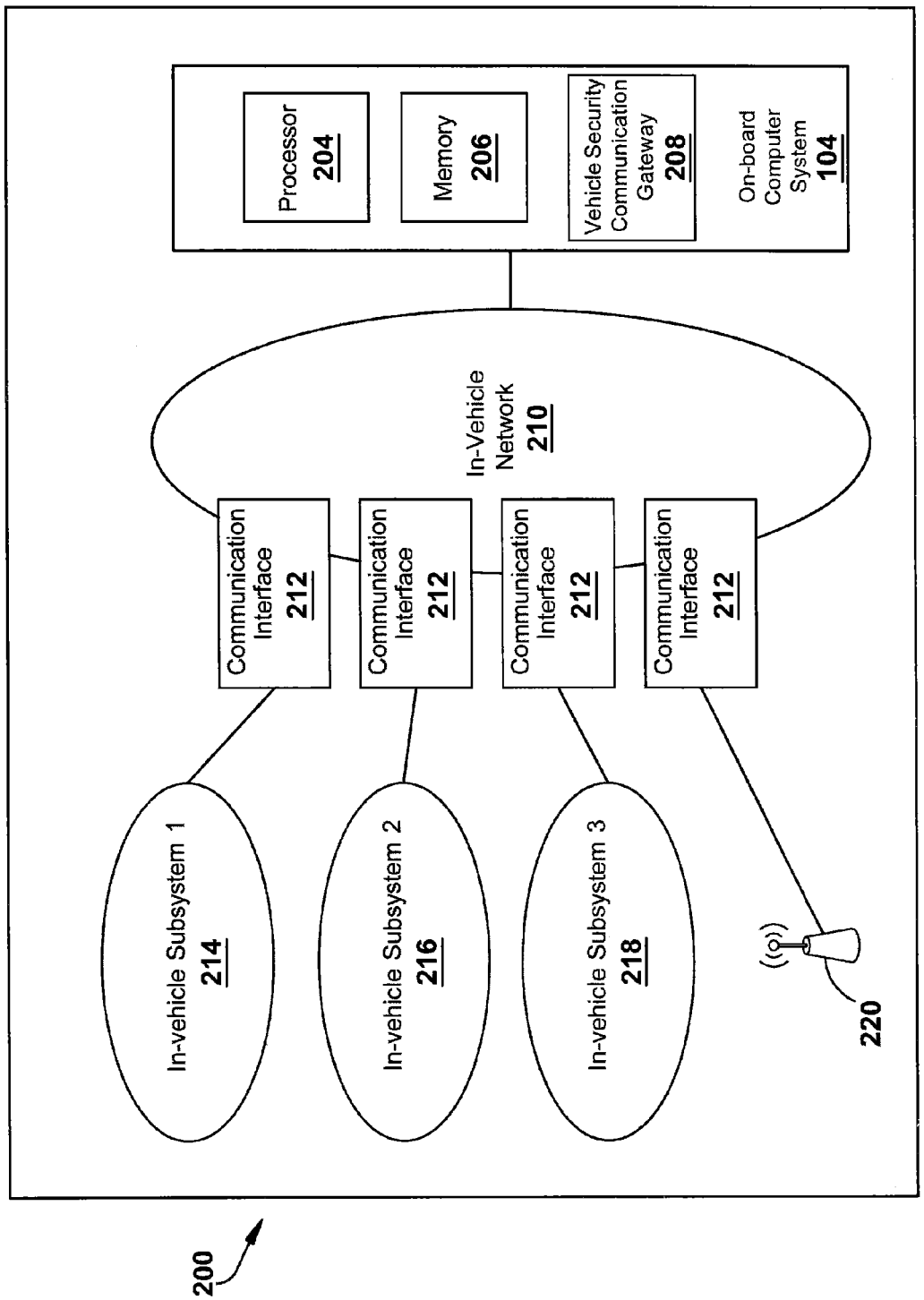
FIG. 2 is a functional block diagram for an example embodiment of a vehicle system.

FIG. 2 is a schematic diagram illustrating an example infrastructure 200 for a connected vehicle 102. The vehicle 102 includes an on-board computer system 104 that operates and/or controls in-vehicle devices. The on-board computer system 104 comprises a processor 204, one or more memory elements 206, and a vehicle security communication gateway 208.

The processor 204, in connection with the one or more memory elements 206, is configured to implement the functionality described herein with reference to the vehicle 102. The one or more memory elements 206 store information needed to operate and/or control the various systems, components, and devices included in and associated with the vehicle. The one or memory elements may further keep information in any suitable memory device (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the on-board computer system 104 could be provided to any database, register, table, cache, queue, control list, or storage structure based on particular needs and implementation, all of which could be referenced in any suitable timeframe.

The processor 204 comprises the necessary elements or logic adapted to execute the software programs to generally perform functions relating to operating and/or controlling systems, components, and devices included in and associated with the vehicle, as described herein. Execution of the sequence of instructions contained in memory element 206 causes processor 204 to perform the process steps described herein. One or more processors in a multi-processing arrangement may also be employed to execute the sequences of instructions contained in memory element 206. In alternative embodiments, hard-wired circuitry may be used in place of or in combination with software instructions to implement an example embodiment. Thus, embodiments described herein are not limited to any specific combination of hardware circuitry and software.

The vehicle security communication gateway 208 functions to facilitate communication between the on-board computer system 104 and in-vehicle devices as well as to facilitate communication between the on-board computer system and external networks, devices, and/or systems (hereinafter referred to collectively as "external devices"). The vehicle security communication gateway 208 may include a configuration capable of TCP/IP communications, UDP/IP, or any other suitable protocol, where appropriate and based on particular needs. In yet another embodiment, the vehicle security communication gateway 208 may further include a configuration capable of accommodating legacy bus subsystems that may be employed to convey information across the myriad of machine devices in the vehicle.

The vehicle security communication gateway 208 is communicatively coupled to an in-vehicle network or bus 210. Examples of suitable network connections include, but are not limited to, controller area network (CAN), a media oriented system transfer (MOST), a local interconnection network (LIN), an Ethernet, and other appropriate connections, such as those that conform to ISO, SAE, and IEEE standards and specifications, and the like. The in-vehicle network 210 enables the vehicle 102 to send and receive information from the on-board computer system 104 to in-vehicle devices, via the vehicle security communication gateway 208, for operating and/or controlling the in-vehicle devices.

In an example embodiment, the in-vehicle network 210 is connected to one or more suitable communication interfaces, illustrated as 212, to facilitate communication between machine devices and/or user devices and the in-vehicle network 210. As illustrated in FIG. 2, the in-vehicle network 210 is connected via a communication interface 212 to in-vehicle subsystem 1 214 for controlling in-vehicle infotainment; to in-vehicle subsystem 2 216 for powertrain control; in-vehicle subsystem 3 218 for body control; and in-vehicle WiFi hotspot 220. While one in-vehicle network 210 and four in-vehicle subsystems are illustrated in FIG. 2, it is understood by one skilled in the art, that the vehicle could include any number of in-vehicle networks and in-vehicle subsystems.

Various in-vehicle devices may collect information relating to the vehicle 102 that, in certain circumstances may be personal or confidential in nature. For example, in-vehicle devices and associated services may collect personally identifiable information relating to the vehicle occupants, energy use of the vehicle, driving habits of the driver of the vehicle, and the like. Unauthorized access or distribution of such personal identification information may be damaging to users of the vehicle.

A connected vehicle 102 may also be designed such that control signals can be sent from external devices to the vehicle and/or in-vehicle devices. For example, a smartphone or other device may interface with the vehicle via the network 120 and control certain vehicle functions remotely. Such services, their associated network connections, and transmitted control information may be exposed to either malicious or coincidental tampering, resulting in unauthorized control messages being sent to the vehicle 102 and/or in-vehicle devices. Malicious attacks on the vehicle 102 may include, but are not limited to, denial of service attacks, manipulation of vehicle controls, attacks directed to vehicle systems or subsystems, introduction of malware, and/or any other attack launched against the vehicle 102 or its constituent systems.

Due to the nature of connected vehicles, malicious attacks against a vehicle 102 may not be limited to attacks requiring intra-vehicle or near-vehicle access. For example, remote attacks may be launched giving an attacker control of vehicle functions controlled by one or more machine devices. Attacks may be mounted from the Internet and be directed to a specific vehicle or group of vehicles. As with any entity that exists in cyberspace, security risks or malicious attacks to the connected vehicle may be launched from within the vehicle, near the vehicle, or over the Internet or other network at large.

Figure 3:
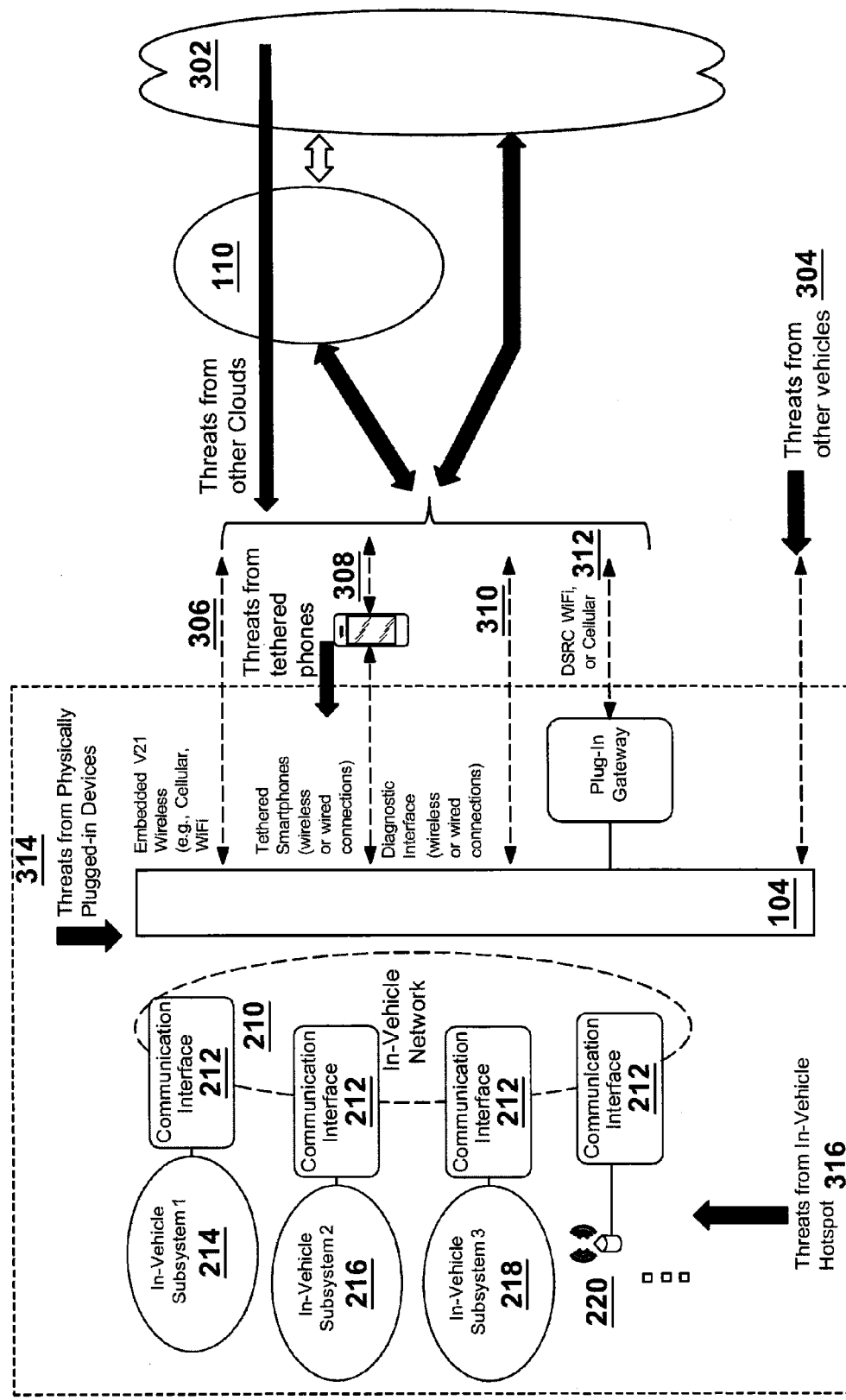
FIG. 3 is a graphical representation illustrating examples of security threats to a vehicle.

FIG. 3 is a schematic diagram 300 illustrating a multitude of security threats or malicious attacks that may be launched against the vehicle 102. As illustrated in FIG. 2, the on-board computer system 104 includes vehicle security communication gateway 208, which is the primary interface for communication with external devices. Security threats or malicious attacks may be launched from such external devices. For example, security threats may be launched from other cloud-based systems or services as illustrated at 302. Such threats may be received directly from another cloud-based system at the vehicle security communication gateway 208 or from another cloud-based system via the Security Cloud 110. Security threats may also be launched from other vehicles as illustrated at 304.

Security threats or malicious attacks may also be launched from in-vehicle devices. For example, security threats may be launched from embedded vehicle-to-Internet wireless connections, such as cellular technologies, wireless technologies (e.g., WiFi), and the like, as illustrated at 306. Security threat may also be launched from in-vehicle mobile devices via either wired or wireless connections, such as via cellular telephones as illustrated at 308. Security threats may further be launched via an on-board diagnostics interface, via either wired or wireless connections, as illustrated at 310. Security threats may also be launched via a plug-in gateway or interface, via a wireless connection, such as cellular technologies, wireless technologies (e.g., WiFi, DSRC), and the like as illustrated at 312. Security threats may further be launched from in-vehicle devices which are physically connected to the vehicle as illustrated at 314. In addition, security threats may be launched via in-vehicle wireless hotspot as illustrated at 316.

Figure 4:
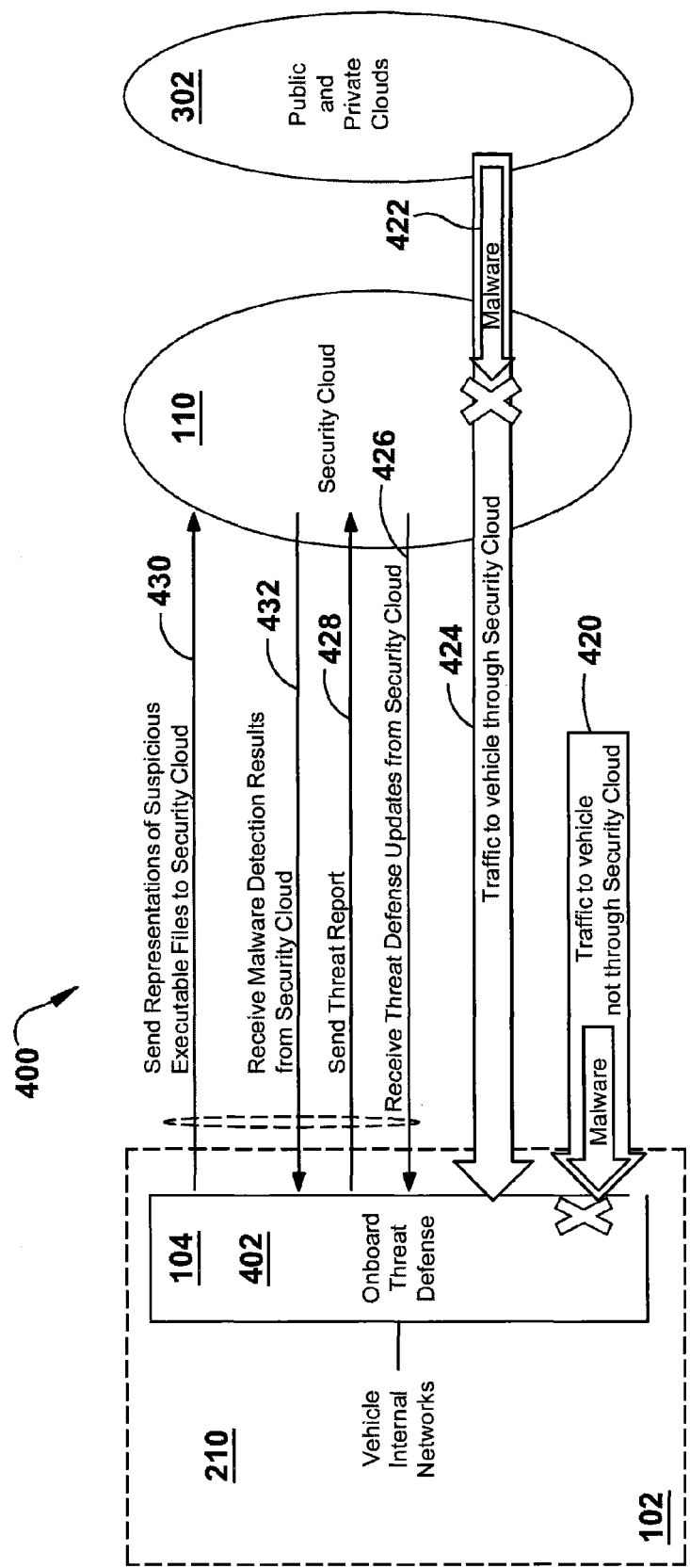
FIG. 4 is a functional block diagram illustrating an example embodiment of a cloud-assisted threat defense architecture.

FIG. 4 is an example architecture 400 showing operation of a cloud-assisted threat defense system for vehicles in accordance with an example embodiment showing in particular workings of the various components in accordance with the example embodiment. The functional events and actions illustrated in this architecture is by way of example only and is not intended to limit the operation of any alternative embodiments. As illustrated in FIGS. 1 and 2, the example system includes at least one vehicle 102 having an on-board computer system 104 for operating and/or controlling in-vehicle devices and a Security Cloud 110 communicatively coupled via a network 120 to facilitate the transfer of information between the on-board computer system 104 and the Security Cloud 110. The vehicle 102 also includes an on-board threat defense module 402 which functions to detect and protect against malware attacks and other security threats to the vehicle. The on-board threat defense module 402, its components, and functionality will be set forth in greater detail with respect to FIG. 5 discussed below. The on-board threat defense module 402 is suitably communicatively coupled to in-vehicle network 210 as is known in the art.

As illustrated in FIG. 4, the vehicle includes an on-board threat defense module 402 which functions to detect and protect against malware attacks and other security threats that have reached the vehicle by any means, such as from external devices, in-vehicle devices, and combinations thereof. For example, a security threat may be received from an external device, such as another vehicle, directly at the vehicle without interaction with the Security Cloud 110 as illustrated at 420.

The on-board threat defense module 402 must detect and protect against all security threats that reach the vehicle. However, on board threat defense systems typically have limited processing capabilities and storage due to stringent cost constraints. In addition, on-board threat defense systems must be continuously updated over the lifecycle of the vehicle as new security threats are constantly arising, resulting in increased storage requirements in order to defend against the growing number of threats.

In an example embodiment, the Security Cloud 110 assists with the detection and protection against security threats and malware attacks to the vehicle 102 while minimizing the processing load and memory requirements for the on-board threat defense module 402 as illustrated in FIG. 4. In an example embodiment herein, the on-board threat defense module 402 maintains a small on-board database of threat-related information which is used to scan incoming data, files, or other information for security threats. For simplicity purposes, "file" will refer to any data, file, group of files, or other information transmitted to or received from the vehicle 102. In an example embodiment, the Security Cloud 110 functions to control access to the on-board computer system 104 from external devices. The Security Cloud 110 also functions to detect and protect the vehicle 102 from security threats and to maintain the on-board threat defense module capabilities up to date.

As illustrated in FIG. 4, in an example embodiment, in operation, the Security Cloud 110 functions to detect new malware targeted to vehicles, malicious Internet sites, and other potential security threats to a vehicle, and suitably maintains a database of such threats as will be discussed in greater detail below. In an example, the Security Cloud 110 suitably blocks or prevents any such threats received at the Security Cloud from reaching the vehicle 102. For example, incoming files may be received from another cloud-based system 302 at the Security Cloud 110. The Security Cloud 110 determines if such incoming files includes a security threat as illustrated at 422. If the Security Cloud 110 determines that the file includes malware or some other security threat, the Security Cloud blocks or prevents the file from being sent to the vehicle. If the Security Cloud 110 determines that the file is not a threat to the vehicle, the file is sent to the vehicle as illustrated at 424.

In an example embodiment, the Security Cloud 110 maintains a list of detected malware, malicious Internet sites, and other potential security threats to the vehicle 102. In an example, the Security Cloud 110 periodically provides updated threat-related information to the vehicle 102 to maintain the on-board threat defense module 402 capabilities up to date as illustrated at 426. The Security Cloud 110 determines which security threats are relevant to the vehicle 102 and provides the updated threat information to the vehicle for storage in the on-board database. As such, the on-board threat defense module 402 capabilities are continuously up to date over the lifecycle of the vehicle 102. In an example embodiment, the on-board threat defense module 402 capabilities are maintained within the limited processing capabilities and storage constraints of on-board systems.

As further illustrated in FIG. 4, in an example embodiment, in operation, the on-board threat defense module 402 detects and protects against security threats which reach the vehicle 102 from external devices, in-vehicle devices, and combinations thereof. For example, incoming files may be received from an external device, such as another vehicle, directly at the vehicle without interaction with the Security Cloud 110 as illustrated at 420.

Figure 5:
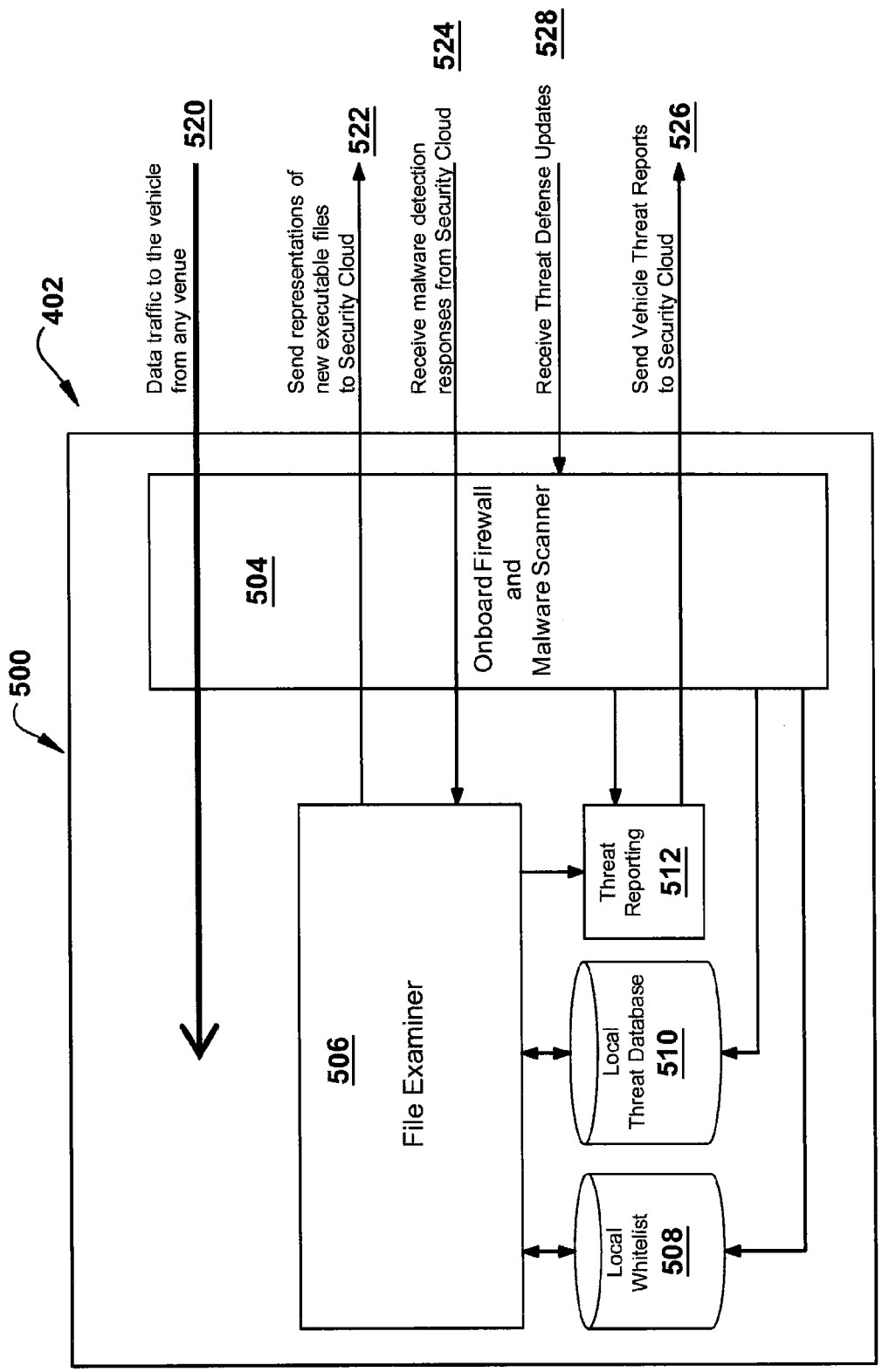
FIG. 5 is a functional block diagram illustrating an example embodiment of an on-board threat defense module.

In an example embodiment, the on-board threat defense module 402 will analyze an incoming file to determine if the file includes a security threat. In an example embodiment, the on-board threat defense module 402 will scan the incoming file to detect a security threat based on threat-related information stored in an on-board database or databases as illustrated in FIG. 5. For example, the on-board databases may include information as to those files which do not pose a security threat and those files which do pose a security threat. If the on-board threat defense module 402 determines that the incoming file does not pose a security threat based on data within the on-board databases, the on-board threat defense module 402 will allow the file to execute.

If the on-board threat defense module 402 determines that the incoming file does pose a security threat based on data within the on-board databases, the on-board threat defense module 402 will prevent the file from executing. In an example embodiment, the on-board threat defense module 402 will generate a threat report regarding the security threat and will send the threat report to the Security Cloud 110 for further processing therein as illustrated at 428. The information contained in a threat report is discussed in detail in connection with FIGS. 5 and 7.

In an example embodiment, if the on-board databases do not include any threat-related information regarding the incoming file, the on-board threat defense module 402 will transmit data related to the file to the Security Cloud 110 as illustrated at 430. In an example embodiment, the Security Cloud 110 will analyze the received data to determine if the file poses a security threat based on threat-related information maintained by the Security Cloud 110. The Security Cloud 110 will then transmit the results of such analysis to the on-board threat defense module 402 for further processing as illustrated at 432. If the Security Cloud 110 determines that the file does not pose a security threat based on data maintained by the Security Cloud 110, the Security Cloud 110 will transmit data or a signal representative of such determination to the on-board threat defense module 402, which will, in response thereto, allow the file to execute. If the Security Cloud 110 determines that file poses a security threat, the Security Cloud 110 will transmit data or a signal representative of such determination to the on-board threat defense module 402, which will, in response thereto, prevent the file from executing.

FIG. 5 is a schematic diagram illustrating an example architecture 500 of an on-board threat defense module 402 for a vehicle 102. In an example embodiment, the on-board threat defense module 402 includes an on-board firewall and malware scanning component 504, file examination logic 506, a local whitelist database 508, a local threat database 510, and threat reporting logic 512.

It is to be understood that the on-board threat defense module 402 may suitably comprise logic for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

It is to be understood that the on-board threat defense module 402 may be implemented on the on-board computer system 104, a component of the on-board computer system, an in-vehicle device, and combinations thereof, or as a stand-alone module accessible by the on-board computer system, a component of the on-board computer system, an in-vehicle device, and combinations thereof. Notably, while the illustrated embodiment describes a single on-board threat defense module 402, merely for ease of illustration, it is understood that the example embodiments described herein may suitably comprise any physically realizable number of on-board threat defense modules as needed to perform the functionality described herein.

In an example embodiment, the on-board firewall and malware scanning component 504 functions to monitor and control incoming and outgoing files between the vehicle and external devices as well as between the vehicle and in-vehicle devices. The on-board firewall and malware scanning component 504 scans incoming files in order to detect any security threats, malicious attacks, or malware sent or launched from external devices, in-vehicle devices, and combinations thereof as illustrated at 520. The on-board firewall and malware scanning component 504 detects such security threats by any suitable process, system, algorithm, or the like as is known in the art. The on-board firewall and malware scanning component 504 scans selected incoming files based on data contained in the local whitelist database 508, the local threat database 510, and/or on at least one predefined condition or factor as discussed in detail below. Such selective scanning of incoming files minimizes the processing and storage requirements for the on-board threat defense module 402.

In an example embodiment, the file examination logic 506 inspects or examines selected files which reach the vehicle 102 from external devices, in-vehicle devices, and combinations thereof to determine if such files pose a security threat to the vehicle. The file examination logic 506 inspects such files by any suitable process, system, algorithm, or the like as is known in the art. In an example embodiment herein, the file examination logic 506 does not inspect all files received by the on-board threat defense module 402, but only inspects files having predefined characteristics. As an example, the file examination logic 506 inspects any executable file that attempts to run on the on-board computer system 104, any file that is received at the vehicle security communication gateway and communicated therefrom to an in-vehicle network, any file with other specified characteristics, and combinations thereof. Such selective inspection of files minimizes the processing and storage capabilities required as well as the processing time.

In operation, the file examination logic 506 will analyze a file to determine if the file poses a security threat based on threat-related information maintained by the on-board threat defense module 402. For example, the file examination logic 506 will analyze the file against information contained in the local whitelist database 508, information contained in the local threat database 510, and combinations thereof. The local whitelist database 508 and the local threat database 510 are any suitable database, schema, data structure, or the like for storing and organizing data as is known in the art.

In an example embodiment, the local whitelist database 508 includes data representative of executable files known not to contain malware or which do not pose a security threat to the vehicle 102. In an example embodiment, the local whitelist database 508 includes identification data associated with each file contained therein. For example, the identification data for a file may be a cryptographic hash value associated with at least a portion of the file, a digital signature associated with at least a portion of the file, or other unique identification data associated with at least a portion of the file, and combinations thereof as is known in the art.

In an example embodiment, the local threat database 510 includes data representative of executable files known to contain malware or which pose a security threat to the vehicle 102. In an example embodiment, the local threat database 510 includes identification data associated with each file contained therein. For example, the identification data for a file may be a cryptographic hash value associated with at least a portion of the file, a digital signature associated with at least a portion of the file, or other unique identification data associated with at least a portion of the file, and combinations thereof as is known in the art.

In an example embodiment, the file examination logic 506 will inspect the local whitelist database 508 and/or the local threat database 510 to determine if related data about a file is contained therein. For example, if the file examination logic 506 determines that local whitelist database 508 contains identification data for a selected file indicating that the file does not pose a security threat to the vehicle 102, the on-board threat defense module 402 will transmit a message or signal to the on-board computer system 104 and/or appropriate in-vehicle device to allow the file to run or execute thereon. As another example, if the file examination logic 506 determines that the local threat database 510 contains identification data for a selected file indicating that the file poses a security threat to the vehicle 102, the on-board threat defense module 402 will transmit a message or signal to the on-board computer system 104 and/or the appropriate in-vehicle device to prevent the file from running or executing thereon.

In an example, if the file examination logic 506 determines that neither the local whitelist database 508 nor the local threat database 510 contain data related to a specified file, the file examination logic 506 will transmit data related to the file to the Security Cloud 110 as illustrated at 522. The file examination logic 506 will transmit data related to the file to the Security Cloud 110 in any suitable format as is known in the art. For example, if the subject file is relatively small in size, the file examination logic 506 may transmit the actual file. As another example, if the subject file is relatively large in size, the file examination logic 506 may transmit identification data associated with at least a portion of the file, such as a cryptographic hash value or digital signature, a portion of the file, or the like as is known in the art. As an example, if the file examination logic 506 only sends identification data or a portion of the file to the Security Cloud 110 for larger files, rather than the entire file, this will reduce the communication load between the vehicle and the Security Cloud 110.

In an example embodiment, the Security Cloud 110 will analyze the received data to determine if the file poses a security threat as will be discussed in detail below. The Security Cloud 110 will then transmit the results of such analysis to the file examination logic 506 for further processing as illustrated at 524. If the Security Cloud 110 determines that the file does not pose a security threat based on data maintained by the Security Cloud 110, the Security Cloud 110 will transmit data representative of such determination to the file examination logic 506, which will, in response thereto, allow the file to execute. The file examination logic 506 may then update the local whitelist database 508 as required to include the information received from the Security Cloud 110. In an example embodiment, the identification data for a file processed by the Security Cloud 110 and transmitted back to the vehicle 102 may include a digital signature representative of the file being examined by the Security Cloud 110.

If the Security Cloud 110 determines that file poses a security threat, the Security Cloud 110 will transmit data representative of such determination to the file examination logic 506, which will, in response thereto, prevent the file from executing. The file examination logic 506 may then update the local threat database 510 as required to include the information received from the Security Cloud 110. In an example embodiment, the identification data for a file processed by the Security Cloud 110 and transmitted back to the vehicle 102 may include a digital signature representative of the file being examined by the Security Cloud 110.

The frequency of which the file examination logic 506 must transmit data to the Security Cloud 110 for threat analysis is a function of the size and contents of the local whitelist database 508 and/or the local threat database 510. For example, if the on-board threat defense module 402 maintains a local whitelist database 508 and/or a local threat database 510 which are smaller in size, then such databases will be less likely to contain data related to received files, and the file examination logic 506 will transmit data to the Security Cloud 110 more frequently. As another example, if the on-board threat defense module 402 maintains a local whitelist database 508 and/or a local threat database 510 which are larger in size, then such databases will be more likely to contain data related to received files, and the file examination logic 506 will transmit data to the Security Cloud 110 less frequently. In an example embodiment, the on-board threat defense module 402 may dynamically adjust the size of the local databases to balance the amount of local processing and storage by the on-board threat defense module 402 versus the volume of traffic between the vehicle 102 and the Security Cloud 110 for threat protection.

In an example embodiment, the threat reporting logic 512 receives data related to security threats experienced by the vehicle 102. Data related to security threats experienced by the vehicle may be from the on-board firewall and malware scanner 504 as a result of threats detected thereby, from the file examination logic 506 as a result of threats detected thereby, from in-vehicle devices, from external devices, and/or combinations thereof. The threat reporting logic 512 suitably generates threat reports based on the received security threat data. The threat reporting logic 512 generates such reports by any suitable process, system, algorithm, or the like as is known in the art. In an example embodiment, the threat reporting logic 512 transmits the threat reports to the Security Cloud 110 for further processing via any suitable means known in the art as illustrated at 526.

In an example embodiment, the threat reporting logic 512 may generate any number of report formats or types, each type containing specified data as determined or required for such type. In an example embodiment, the threat reporting logic 512 may generate a Type I threat report and a Type II threat report. For example, a Type I threat report may suitably contain data related to security threats experienced by the vehicle 102, but the threat report will not provide any data as to the source of the threat. As an example, a Type I threat report will not contain any identification information as to any entity, device, network, and/or system which may have launched the threat.

As another example, a Type II threat report may contain data related to security threats experienced by the vehicle 102, but will also contain information as to a source of the security threat. However, Type II threat reports contain more information about security threats than Type I threat reports. As an example, a Type II threat report may not contain accurate information as the information contained therein, such as the source, may be comprised. For example, a Type II threat report may contain false information, such as reporting a security threat when none existed, in an attempt to have the on-board threat defense module 402 recognize a legitimate file as a security threat, wherein the source of such file will be considered a security threat as well.

In an example embodiment, the on-board threat defense module 402 also suitably receives threat defense updates from the Security Cloud 110. In an example, the Security Cloud 110 maintains a list of detected malware, malicious Internet sites, and other potential security threats to the vehicle 102. In an example, the Security Cloud 110 suitably periodically provides updated threat-related information to the vehicle 102 to maintain the on-board threat defense module 402 capabilities up to date. The Security Cloud 110 determines which security threats are relevant to the vehicle 102 and provides the updated threat information to the vehicle. In an example embodiment, the Security Cloud 110 transmits the updated threat information to the on-board threat defense 402 as illustrated at 528. In an example, the updated threat information is received by the on-board firewall and malware scanner 504 for processing as required. In an example, the local whitelist database 508 and/or the local threat database 510 are updated with the information received from the Security Cloud 110 as required by any means known in the art.

In view of the foregoing structural and functional features described above, methodologies in accordance with example embodiments will be better appreciated with reference to FIGS. 6 and 8-10. While, for purposes of simplicity of explanation, the methodologies of FIGS. 6 and 8-10 are shown and described as executing serially, it is to be understood and appreciated that the example embodiment is not limited by the illustrated order, as some aspects could occur in different orders and/or concurrently with other aspects from that shown and described herein. Moreover, in accordance with an example embodiment, not all illustrated features may be required. The methodologies described herein are suitably adapted to be implemented in hardware, software, or a combination thereof. For example, the methods may be implemented by the on-board computer system 104, the on-board threat defense module 402, the Security Cloud 110, or combinations thereof.

Figure 6:
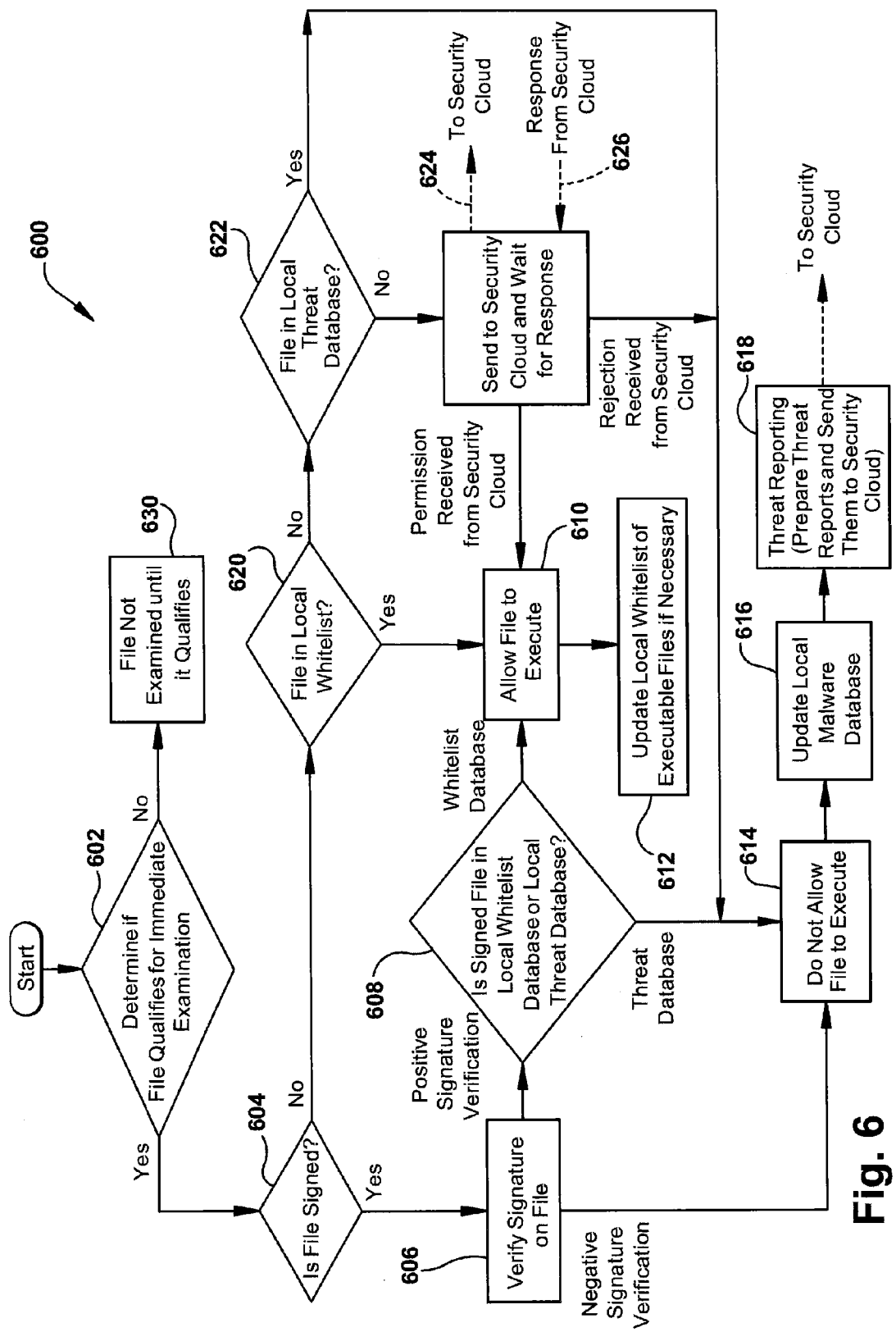
FIG. 6 illustrates an example of methodology for detecting and protecting against security threats by an on-board threat defense module.

FIG. 6 is a flow chart of an example method 600 for analyzing files by the on-board threat defense module 402 to determine if a file poses a security threat to the vehicle 102 as described herein. Method 600 may suitably be implemented on a system for cloud-assisted threat defense as described herein.

At 602, a determination is made whether a file received by the on-board threat defense module 402 should be examined by the file examination logic 506. In an example embodiment, if a received file is destined or to be transmitted to a secure network on the vehicle 102, such as an on-board ECU, then the file is subject to immediate examination by the file examination logic 506 and the process proceeds to 604 as will be discussed below. An example of such a secure network is any of the in-vehicle subsystems as illustrated in FIG. 2, as 214, 216, or 218.

In an example embodiment, if the received file is an executable file, then the file is subject to immediate examination by the file examination logic 506, and the process proceeds to 604. In an example embodiment, the on-board threat defense module 402 maintains or has access to data representative of executable filename extensions (hereinafter referred to as "executable filename extension data") that represent files that are likely to pose a security threat. As an example, selected executable filename extensions can be executed via a suitable operating system, such as Windows, Mac OS, Linux, and the like, without requiring the installation of any additional programs or files. Representative examples of such executable filename extensions, format associated therewith, and applicable operative systems are provided in Table 1 hereto. It is to be understood that Table 1 is not intended to be comprehensive or complete listing of such executable filename extensions.

TABLE 1

| Extension | Format | Operating System(s) |
|---|---|---|
| ACTION | Automator Action | Mac OS |
| APK | Application | Android |
| APP | Executable | Mac OS |
| BAT | Batch File | Windows |
| BIN | Binary Executable | Windows, Mac OS, Linux |
| CMD | Command Script | Windows |
| COM | Command File | Windows |
| COMMAND | Terminal Command | Mac OS |
| CPL | Control Panel Extension | Windows |
| CSH | C Shell Script | Mac OS, Linux |
| EXE | Executable | Windows |
| GADGET | Windows Gadget | Windows |
| INF[1] | Setup Information File | Windows |
| INS | Internet Communication Settings | Windows |
| INX | InstallShield Compiled Script | Windows |
| IPA | Application | iOS |
| ISU | InstallShield Uninstaller Script | Windows |
| JOB | Windows Task Scheduler Job File | Windows |
| JSE | JScript Encoded File | Windows |
| KSH | Unix Korn Shell Script | Linux |
| LNK | File Shortcut | Windows |
| MSC | Microsoft Common Console Document | Windows |
| MSI | Windows Installer Package | Windows |
| MSP | Windows Installer Patch | Windows |
| MST | Windows Installer Setup Transform File | Windows |
| OSX | Executable | Mac OS |
| OUT | Executable | Linux |

TABLE 1-continued

| Extension | Format | Operating System(s) |
|---|---|---|
| PAF | Portable Application Installer File | Windows |
| PIF | Program Information File | Windows |
| PRG | Executable | GEM |
| PS1 | Windows PowerShell Cmdlet | Windows |
| REG | Registry Data File | Windows |
| RGS | Registry Script | Windows |
| RUN | Executable | Linux |
| SCT | Windows Scriptlet | Windows |
| SHB | Windows Document Shortcut | Windows |
| SHS | Shell Scrap Object | Windows |
| U3P | U3 Smart Application | Windows |
| VB | VBScript File | Windows |
| VBE | VBScript Encoded Script | Windows |
| VBS | VBScript File | Windows |
| VBSCRIPT | Visual Basic Script | Windows |
| WORKFLOW | Automator Workflow | Mac OS |
| WS | Windows Script | Windows |
| WSF | Windows Script | Windows |

In an example embodiment, the file is analyzed against the executable filename extension data to determine if the file contains such an extension as is known in the art. If it is determined that the file contains an executable filename extension that is included in the executable filename extension data, then the file is subject to immediate examination by the file examination logic 506 and the process proceeds to 604 as will be discussed below.

In an example embodiment, if a non-executable file attempts to execute, then the file is subject to immediate examination by the file examination logic 506, and the process proceeds to 604 as will be discussed in detail below. In an example embodiment, an attempt by a non-executable file to execute will suitably trigger or cause the file examination logic 506 to immediately commence examination of such file.

It is to be understood that malware or security threats may be embedded in a file with a filename extension that is not included in the executable filename extension data which is maintained by the on-board threat defense module 402. As an example, malware may be embedded within an mp3 file or the like. For such a file to harm or attack the vehicle 102, the on-board computer system 104, or in-vehicle devices, the file will have to execute. As most non-executable files will likely not contain malware, the number of files that must be examined immediately by the file examination logic 506 may be significantly reduced by delaying the examination of non-executable files until such time as such a file attempts to execute.

Typically, an attempted execution by a non-executable file will require some form of user authorization, such as prompting the user to allow the file to execute, or any other user authorization mechanism as is known in the art. In an example embodiment, a user authorization mechanism may suitably be used as the triggering mechanism to trigger the file examination logic to immediately examine such file. Representative examples of basic filename extensions that require a specified program to be installed before the file can be executed, format associated therewith, and applicable program required are provided in Table 2 hereto. It is to be understood that Table 2 is not intended to be comprehensive or complete listing of such basic filename extensions.

TABLE 2

| Extension | Format | Program |
|---|---|---|
| 0XE | Renamed Virus File | F-Secure Internet Security |
| 73K | TI-73 Application | TI Connect |

TABLE 2-continued

| Extension | Format | Program |
|---|---|---|
| 89K | TI-89 Application | TI Connect |
| A6P | Authorware 6 Program File | Adobe Authorware |
| AC | GNU Autoconf Script | Autoconf |
| ACC | GEM Accessory File | Gemulator |
| ACR | ACRobot Script | ACRobot |
| ACTM | AutoCAD Action Macro | AutoCAD |
| AHK | AutoHotkey Script | AutoHotkey |
| AIR | Adobe AIR Installation Package | Adobe AIR |
| APP | FoxPro Application | Visual FoxPro |
| ARSCRIPT | ArtRage Script | ArtRage Studio |
| AS | Adobe Flash ActionScript File | Adobe Flash |
| ASB | Alphacam Stone VB Macro | Alphacam |
| AWK | AWK Script | AWK |
| AZW2 | Kindle Active Content App File | Kindle Collection Manager |
| BEAM | Compiled Erlang File | Erlang |
| BTM | 4DOS Batch File | 4DOS |
| CEL | Celestia Script | Celestia |
| CELX | Celestia Script | Celestia |
| CHM | Compiled HTML Help File | Firefox, IE, Safari |
| COF | MPLAB COFF File | MPLAB IDE |
| CRT | Security Certificate | Firefox, IE, Chrome, Safari |
| DEK | Eavesdropper Batch File | Eavesdropper |
| DLD | EdLog Compiled Program | Edlog |
| DMC | Medical Manager Script | Sage Medical Manager |
| DOCM | Word Macro-Enabled Document | Microsoft Word |
| DOTM | Word Macro-Enabled Template | Microsoft Word |
| DXL | Rational DOORS Script | Rational DOORS |
| EAR | Java Enterprise Archive File | Apache Geronimo |
| EBM | EXTRA! Basic Macro | EXTRA! |
| EBS | E-Run 1.x Script | E-Prime (v1) |
| EBS2 | E-Run 2.0 Script | E-Prime (v2) |
| ECF | SageCRM Component File | SageCRM |
| EHAM | ExtraHAM Executable | HAM Programmer Toolkit |
| ELF | Nintendo Wii Game File | Dolphin Emulator |
| ES | SageCRM Script | SageCRM |
| EX4 | MetaTrader Program File | MetaTrader |
| EXOPC | ExoPC Application | EXOfactory |
| EZS | EZ-R Stats Batch Script | EZ-R Stats |
| FAS | Compiled Fast-Load AutoLISP File | AutoCAD |
| FKY | FoxPro Macro | Visual FoxPro |
| FPI | FPS Creator Intelligence Script | FPS Creator |
| FRS | Flash Renamer Script | Flash Renamer |
| FXP | FoxPro Compiled Program | Visual FoxPro |
| GS | Geosoft Script | Oasis Montaj |
| HAM | HAM Executable | Ham Runtime |
| HMS | HostMonitor Script | HostMonitor |
| HPF | HP9100A Program File | HP9100A Emulator |
| HTA | HTML Application | Internet Explorer |
| IIM | iMacro Macro | iMacros (Firefox Add-on) |
| IPF | SMS Installer Script | Microsoft SMS |
| ISP | Internet Communication Settings | Microsoft IIS |
| JAR | Java Archive | Firefox, IE, Chrome, Safari |
| JS | JScript Executable Script | Firefox, IE, Chrome, Safari |
| JSX | ExtendScript Script | Adobe ExtendScript Toolkit |
| KIX | KiXtart Script | KiXtart |
| LO | Interleaf Compiled Lisp File | Quicksilver |
| LS | Lightwave LScript File | Lightwave |
| MAM | Access Macro-Enabled Workbook | Microsoft Access |
| MCR | 3ds Max Macroscript or Tecplot Macro | 3ds Max |
| MEL | Maya Embedded Language File | Maya 2013 |
| MPX | FoxPro Compiled Menu Program | Visual FoxPro |
| MRC | mIRC Script | mIRC |
| MS | 3ds Max Script | 3ds Max |
| MS | Maxwell Script | Maxwell Render |
| MXE | Macro Express Playable Macro | Macro Express |
| NEXE | Chrome Native Client Executable | Chrome |
| OBS | ObjectScript Script | ObjectScript |
| ORE | Ore Executable | Ore Runtime Environment |
| OTM | Outlook Macro | Microsoft Outlook |
| PEX | ProBoard Executable | ProBoard BBS |
| PLX | Perl Executable | ActivePerl or Microsoft IIS |
| POTM | PowerPoint Macro-Enabled Design Template | Microsoft PowerPoint |
| PPAM | PowerPoint Macro-Enabled Add-in | Microsoft PowerPoint |
| PPSM | PowerPoint Macro-Enabled Slide Show | Microsoft PowerPoint |
| PPTM | PowerPoint Macro-Enabled Presentation | Microsoft PowerPoint |
| PRC | Palm Resource Code File | Palm Desktop |
| PVD | Instalit Script | Instalit |
| PWC | PictureTaker File | PictureTaker |

TABLE 2-continued

| Extension | Format | Program |
|---|---|---|
| PYC | Python Compiled File | Python |
| PYO | Python Optimized Code | Python |
| QPX | FoxPro Compiled Query Program | Visual FoxPro |
| RBX | Rembo-C Compiled Script | Rembo Toolkit |
| ROX | Actuate Report Object Executable | eReport |
| RPJ | Real Pac Batch Job File | Real Pac |
| S2A | SEAL2 Application | SEAL |
| SBS | SPSS Script | SPSS |
| SCA | Scala Script | Scala Designer |
| SCAR | SCAR Script | SCAR |
| SCB | Scala Published Script | Scala Designer |
| SCR | Generic Script | Original Scripting Engine[1] |
| SCRIPT | Generic Script | Original Scripting Engine[1] |
| SMM | Ami Pro Macro | Ami Pro |
| SPR | FoxPro Generated Screen File | Visual FoxPro |
| TCP | Tally Compiled Program | Tally Developer |
| THM | Thermwood Macro | Mastercam |
| TLB | OLE Type Library | Microsoft Excel |
| TMS | Telemate Script | Telemate |
| UDF | Excel User Defined Function | Microsoft Excel |
| UPX | Ultimate Packer for eXecutables File | Ultimate Packer for eXecutables |
| URL | Internet Shortcut | Firefox, IE, Chrome, Safari |
| VLX | Compiled AutoLISP File | AutoCAD |
| VPM | Vox Proxy Macro | Vox Proxy |
| WCM | WordPerfect Macro | WordPerfect |
| WIDGET | Yahoo! Widget | Yahoo! Widgets |
| WIZ | Microsoft Wizard File | Microsoft Word |
| WPK | WordPerfect Macro | WordPerfect |
| WPM | WordPerfect Macro | WordPerfect |
| XAP | Silverlight Application Package | Micrsoft Silverlight |
| XBAP | XAML Browser Application | Firefox, IE |
| XLAM | Excel Macro-Enabled Add-In | Microsoft Excel |
| XLM | Excel Macro-Enabled Workbook | Microsoft Excel |
| XLSM | Excel Macro-Enabled Workbook | Microsoft Excel |
| XLTM | Excel Macro-Enabled Template | Microsoft Excel |
| XQT | SuperCalc Macro | CA SuperCalc |
| XYS | XYplorer Script | XYplorer |
| ZL9 | Renamed Virus File | ZoneAlarm |

If it is determined that a file does not qualify for immediate examination, then flow proceeds to 630, and the file is not examined if and until such time as it qualifies for examination by the file examination logic 506.

At 604, the file examination logic 506 examines a file that qualifies for immediate examination (e.g., destined for a secure network, executable file, non-executable file that attempts to execute) to determine if the file is a security threat to the vehicle 102, the on-board computer system 104, in-vehicle devices, and the like by any suitable means known in the art. In an example embodiment, the file examination logic 506 determines if the file includes a digital signature associated therewith by any means known in the art. If the file examination logic 506 determines that the file does not include a digital signature, then flow proceeds to 620, which will be discussed in detail below. If the file examination logic 506 determines that the file includes a digital signature, then flow proceeds to 606.

At 606, the file examination logic 506 verifies that the signature associated with the file is included in threat-related information maintained by the on-board threat defense module 402. In an example embodiment, the file examination logic 506 analyzes the signed file against information contained in the local whitelist database 508, information contained in the local threat database 510, and combinations thereof. If the file examination logic 506 determines that neither the local whitelist database 508 nor the local threat database 510 contain data related to the signed file, flow proceeds to 614 as discussed in below. If the file examination logic 506 determines that either the local whitelist database 508 or the local threat database 510 contain data related to the signed file, flow proceeds to 608.

It is to be understood, that in an example embodiment, files having a digital signature associated therewith may suitably only include those files which have previously been received by the on-board threat defense module 402 and examined accordingly, examined by the Security Cloud 110 and transmitted to the vehicle 102, and combinations thereof. Thus, data associated with such a signed file would be included in either the local whitelist database 508 or the local threat database 510, and therefore, the file examination logic 506 would not have to verify that data associated with the file is included in threat-related information maintained by the on-board threat defense module 402 as provided at 606.

At 608, a determination is made whether the local whitelist database 508 contains data associated with the signed file or whether the local threat database 510 contains data associated with the signed file. If the file examination logic 506 determines that data associated with the signed file is included in the local whitelist database 508, indicating that the file does not pose a security threat to the vehicle 102, the on-board threat defense module 402 will allow the file to run or execute thereon as illustrated at 610. At 612, the local whitelist database 508 is updated as necessary regarding the signed file.

In an example embodiment, if the file examination logic 506 determines that data associated with the signed file is included in the local threat database 510, indicating that the file poses a security threat to the vehicle 102, the on-board threat defense module 402 will prevent the file from running or executing thereon, as illustrated at 614. At 616, the local threat database 510 is updated as necessary regarding the signed file. At 618, a threat report is generated by the threat reporting logic 512 regarding the signed file and is transmitted to the Security Cloud 110.

At 606, if the file examination logic 506 determines that the file does not include a digital signature, then flow proceeds to 620, wherein the file examination logic 506 determines if data associated with the file is included in the local whitelist database 508. If the file examination logic 506 determines that data associated with the file is included in the local whitelist database 508, indicating that the file does not pose a security threat to the vehicle 102, the on-board threat defense module 402 will allow the file to run or execute thereon as illustrated at 610. At 612, the local whitelist database 508 is updated as necessary regarding the signed file.

If the file examination logic 506 determines that data associated with the file is not included in the local whitelist database 508, then flow proceeds to 622, wherein the file examination logic 506 determines if data associated with the file is included in the local threat database 510. If the file examination logic 508 determines that data associated with the file is included in the local threat database 510, indicating that the file poses a security threat to the vehicle 102, the on-board threat defense module 402 will prevent the file from running or executing thereon, as illustrated at 614. At 616, the local threat database 510 is updated as necessary regarding the signed file. At 618, a threat report is generated by the threat reporting logic 512 regarding the signed file and is suitably transmitted to the Security Cloud 110.

If data associated with the file is not included in either the local whitelist database 508 or the local threat database 510, then flow proceeds to 624. At 624, the file examination logic 506 will transmit data related to the file to the Security Cloud 110. In an example embodiment, the Security Cloud 110 will suitably analyze the received data to determine if the file poses a security threat based on threat-related information maintained by the Security Cloud 110. The Security Cloud 110 will then transmit the results of such analysis to the file examination logic 506 as illustrated at 626. If the Security Cloud 110 determines that the file does not pose a security threat based on data maintained by the Security Cloud 110, the Security Cloud 110 will transmit data representative of such determination to the file examination logic 506, which will, in response thereto, allow the file to execute as illustrated at 610. The file examination logic 506 will update the local whitelist database 508 as necessary to include the information received from the Security Cloud 110 as illustrated at 612.

If the Security Cloud 110 determines that the file poses a security threat, the Security Cloud 110 will transmit data representative of such determination to the file examination logic 506, which will, in response thereto, prevent the file from executing as illustrated at 614. The file examination logic 506 will update the local threat database 510 as necessary to include the information received from the Security Cloud 110 as illustrated at 616. In an example embodiment, the threat reporting logic 512 may generate a threat report for transmission to the Security Cloud 110 as illustrated at 618.

Figure 7:
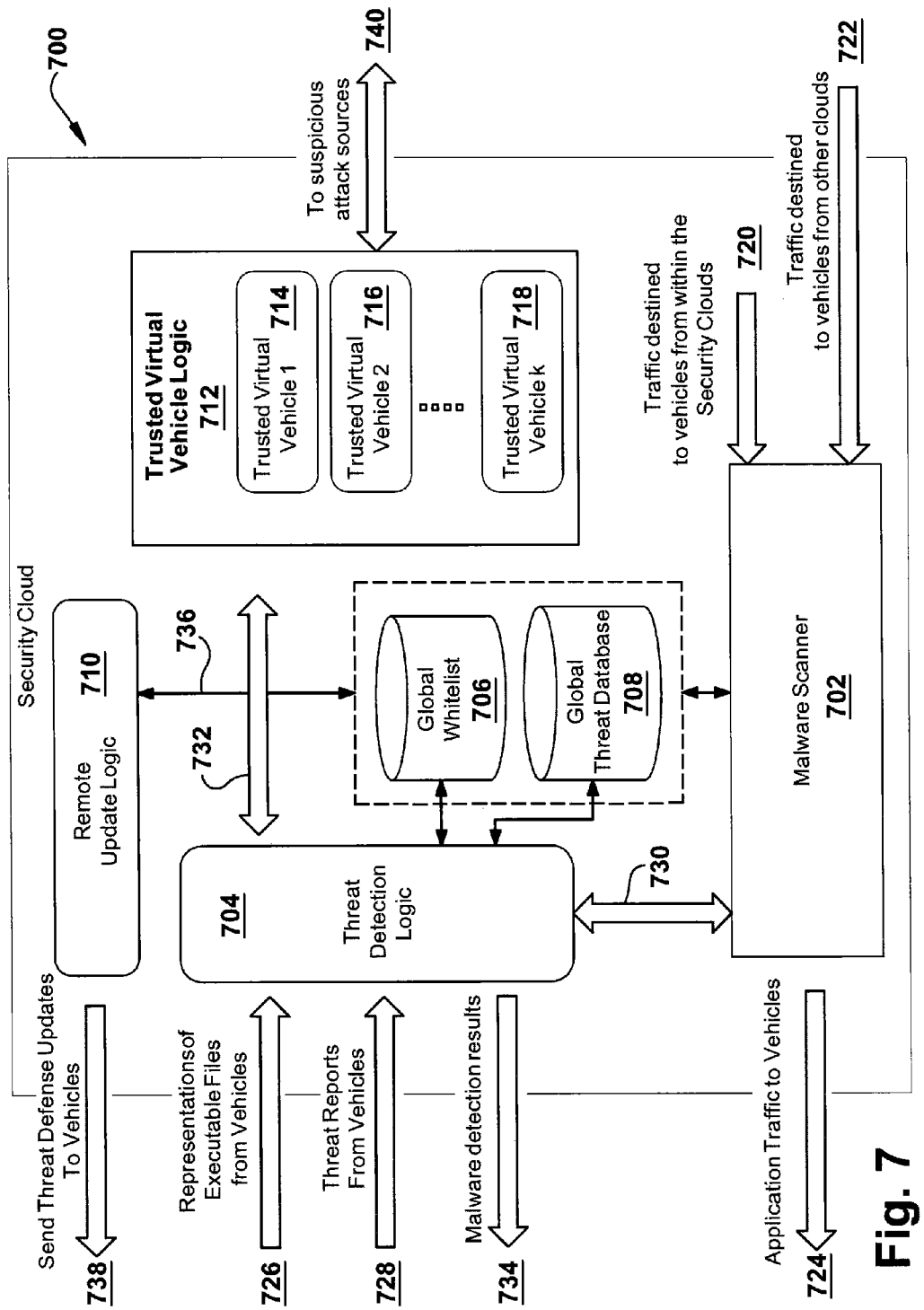
FIG. 7 is a functional block diagram illustrating an example embodiment of a Security Cloud architecture.

FIG. 7 is a schematic diagram illustrating an example architecture 700 of a Security Cloud 110. In an example embodiment, the Security Cloud 110 includes a malware scanning component 702, threat detection logic 704, a global whitelist database 706, a global threat database 708, remote update logic 710, and Trusted Virtual Vehicle logic 712, which includes Trusted Virtual Vehicles 714, 716 and 718. It is to be understood that the Security Cloud 110 may be implemented via any suitable Internet-based computing environment as is known in the art. Notably, while the illustrated embodiment describes a single Security Cloud 110, merely for ease of illustration, it is understood that the example embodiments described herein may suitably comprise any physically realizable number of Security Clouds as needed to perform the functionality described herein.

In an example embodiment, the malware scanning component 702 functions to monitor and control incoming and outgoing files between the vehicle 102 and the Security Cloud 110 as well as between the Security Cloud 110 and other cloud-based systems, devices, networks, and the like. The malware scanning component 702 scans incoming files in order to detect any security threats, malicious attacks, or malware received from within the Security Cloud 110 and destined for the vehicle 102, as illustrated at 720, received from a system, network, device, or the like external to the Security Cloud 110 and destined for the vehicle 102 as illustrated at 722, and combinations thereof. The malware scanning component 702 detects such security threats by any suitable process, system, algorithm, or the like as is known in the art. The malware scanning component 702 scans selected incoming files based on data generated by the threat detection logic 704, based on data contained in the global whitelist database 706 and/or the global threat database 708, and/or combinations thereof as will be discussed in detail below. The malware scanning component 702 then transmits the scanned files to the on-board threat defense module 402 as required as illustrated at 724.

In an example embodiment, the threat detection logic 704 inspects or examines files transmitted from the vehicle 102 to the Security Cloud 110. The threat detection logic 704 inspects such files by any suitable process, system, algorithm, or the like as is known in the art. As an example, the threat detection logic 704 inspects executable files transmitted from the vehicle for examination thereof as illustrated at 726; files contained in threat reports transmitted from the vehicle as illustrated at 728; files detected by the malware scanning component 702 as posing a security threat as illustrated at 730; files detected by the Trusted Virtual Vehicle logic 712 as requiring examination as illustrated at 732; any other files received at the Security Cloud 110 requiring examination thereof; and combinations thereof.

In operation, the threat detection logic 704 will analyze a file to determine if the file poses a security threat based on threat-related information maintained by the Security Cloud 110. As discussed above, the on-board threat defense module 402, via the file examination logic 506 and/or the threat reporting logic 512, will transmit data related to a file to the Security Cloud 110 in any suitable format as is known in the art. For example, if the subject file is relatively small in size, the on-board threat defense module 402 may transmit the actual file. As another example, if the subject file is relatively large in size, the on-board threat defense module 402 may transmit identification data associated with at least a portion of the file, such as a cryptographic hash value or digital signature, a portion of the file, or the like as is known in the art.

In an example embodiment, if the on-board threat defense module 402 transmits an actual file, the threat detection logic 704 will inspect the file to determine whether the file contains malware or any other security threat as is known in the art. In another example embodiment, if the on-board threat defense module 402 transmit identification data associated with the file, the threat detection logic 704 will analyze such data against threat-related information maintained by the Security Cloud 110. For example, the threat detection logic 704 will analyze the file against information contained in the global whitelist database 706, information contained in the global threat database 708, and combinations thereof. The global whitelist database 706 and the global threat database 708 are any suitable database, schema, data structure, or the like for storing and organizing data as is known in the art.

In an example embodiment, the global whitelist database 706 includes data representative of executable files known not to contain malware or which do not pose a security threat to the vehicle 102. In an example embodiment, the global whitelist database 706 includes identification data associated with each file contained therein. For example, the identification data for a file may be a cryptographic hash value associated with at least a portion of the file, a digital signature associated with at least a portion of the file, or other unique identification data associated with at least a portion of the file, and combinations thereof as is known in the art.

In an example embodiment, the global threat database 708 includes data representative of executable files known to contain malware or which pose a security threat to the vehicle 102. In an example embodiment, the global threat database 708 includes identification data associated with each file contained therein. For example, the identification data for a file may be a cryptographic hash value associated with at least a portion of the file, a digital signature associated with at least a portion of the file, or other unique identification data associated with at least a portion of the file, and combinations thereof as is known in the art.

In an example embodiment, the threat detection logic 704 will inspect the global whitelist database 706 and/or the global threat database 708 to determine if data about a file is contained therein. For example, if the threat detection logic 704 determines that the global whitelist database 706 contains identification data for a selected file indicating that the file does not pose a security threat to the vehicle 102, the threat detection logic 704 will transmit the results thereof to the on-board threat defense module 402 as illustrated at 734, wherein the on-board threat defense module 402 will allow the file to run or execute thereon. As another example, if the threat detection logic 704 determines that the global threat database 708 contains identification data for a selected file indicating that the file poses a security threat to the vehicle 102, the threat detection logic 704 will transmit the results thereof to the on-board threat defense module 402, which will prevent the file from running or executing thereon.

In an example embodiment, if the threat detection logic 704 determines that neither the global whitelist database 706 nor the global threat database 708 contain data related to a specified file, the threat detection logic 704 will examine the file to determine whether the file contains malware or any other security threat as is known in the art. If the threat detection logic 704 determines that the file does not pose a security threat, the threat detection logic 704 will transmit the results thereof to the on-board threat defense module 402, which will, in response thereto, allow the file to execute. The threat detection logic 704 may then update the global whitelist database 706 accordingly. If the threat detection logic 704 determines that the file poses a security threat, the threat detection logic 704 will send data representative of such determination to the on-board threat defense module 402, which will, in response thereto, prevent the file from executing. The threat detection logic 704 may then update the global threat database 708 accordingly.

In an example embodiment, the Security Cloud 110 maintains data related to each file it has examined to determine if the file contains malware or other security threats. In example embodiment, the Security Cloud 110 maintains data related to each file it has examined for a particular vehicle, vehicle model, or combinations thereof. As an example, data related to each filed examined by the Security Cloud 110 is maintained in the global whitelist database 706, the global threat database 708, and combinations thereof. As noted above, if the threat detection logic 704 determines that neither the global whitelist database 706 nor the global threat database 708 contained data related to a specified file, the threat detection logic 704 will examine the file to determine whether the file contains malware or any other security threat. Based on whether the file is determined to pose a security threat, the threat detection logic will update the global whitelist database 706 or the global threat database 708 accordingly.

In an example embodiment, updates to the global whitelist database 706 and/or the global threat database 708 will be transmitted to the remote update logic 710 as illustrated at 736. In an example embodiment, the remote update logic 710 will determine if the updated data is relevant to the vehicle and/or if the updated data should be transmitted to the vehicle by any means known in the art. As an example, if the updated data is for a different vehicle make or model than the vehicle, the updated data would not be relevant to the vehicle, and the remote update logic 710 would not transmit the updated data to the vehicle. Accordingly, this reduces the communication load between the Security Cloud 110 and the vehicle 102. It also minimizes the amount of threat-related information that must be maintained by the on-board threat defense module 402. As another example, the updated data may be related to systems, devices, or components which are not included on the vehicle, for different versions of in-vehicle devices than those included on the vehicle 102, and the like, and therefore, the remote update logic 710 would not transmit the updated data to the vehicle.

In an example embodiment, if the remote update logic 710 determines that the updated data should be transmitted to the vehicle 102, the remote update logic 710 transmits the updated data to the on-board threat defense module 402 by any suitable means known in the art as illustrated by 738. The remote update logic may transmit the updated data continuously as it is received or periodically as is appropriate and based on particular needs.

In an example embodiment, the Security Cloud 110 includes Trusted Virtual Vehicle logic 712, which includes a plurality of Trusted Virtual Vehicle emulations illustrated as 714, 716, and 718. The Trusted Virtual Vehicle logic 712 functions to detect security threats targeted to vehicles and to determine the trustworthiness of Type II threat reports received from vehicles. In an example embodiment, a Trusted Virtual Vehicle is a trusted software emulation of an on-board threat defense module 402, which simulates or emulates the hardware and software environment on a selected vehicle model, the communication protocols used by the vehicle for communications between the vehicle and in-vehicle devices and the vehicle and external devices, and the mobility patterns of actual vehicles. In an example embodiment, when external devices communicate with Trusted Virtual Vehicles, the Trusted Virtual Vehicles will behave as if they are actual vehicles distributed across selected geographic regions by any suitable process, system, algorithm, or the like as is known in the art.

Although the illustrated embodiment shown in FIG. 7 includes three Trusted Virtual Vehicles 714, 716, and 718, it is understood by one skilled in the art that the Trusted Virtual Vehicle logic 712 may suitably comprise any number of Trusted Virtual Vehicles as needed to perform the functionality described herein. The number of Trusted Virtual Vehicles and the behaviors associated therewith may be changed dynamically by the Security Cloud 110 as appropriate and based on particular needs.

In an example embodiment, a Trusted Virtual Vehicle communicates with external networks, systems, and devices as an actual vehicle would. For example, the Trusted Virtual Vehicle may communicate with other vehicles, other cloud-based systems, communication networks, the Internet, and the like. As the Trusted Virtual Vehicles may communicate with networks, systems, and devices with which the actual vehicle 102 may not communicate, the Trusted Virtual Vehicles may encounter new security threats that have not yet propagated onto the vehicle. In an example embodiment, a Trusted Virtual Vehicle, in conjunction with the Trusted Virtual Vehicle logic 712 and/or the threat detection logic 704, will inspect a file received at the Trusted Virtual Vehicle to determine if the file poses a security threat. As an example, the Trusted Virtual Vehicle will inspect received files to determine if the file is an executable file. If an executable file is received by the Trusted Virtual Vehicle, a determination will be made if data related to such executable file is maintained by the Security Cloud 110 as discussed above.

In an example embodiment, if data related to the executable file received at the Trusted Virtual Vehicle is not maintained by the Security Cloud 110, then the Trusted Virtual Vehicle transmits data related to such file to the threat detection logic 704 as illustrated at 732 for examination by the threat detection logic 704. The threat detection logic 704 will examine the executable file and determine if such file poses a security threat to the vehicle 102 as discussed in detail above. If data related to the executable file received by the Trusted Virtual Vehicle is maintained by the Security Cloud 110, such file will not need to be transmitted to the threat detection logic 704 for examination unless the file requires further examination for any reason.

In an example embodiment, the Trusted Virtual Vehicles also functions to determine the trustworthiness of Type II threat reports received from the vehicle 102. As discussed above, a Type II threat report may contain data related to security threats experienced by the vehicle 102 as well as information as to a source of the security threat. However, Type II threat reports may not contain accurate information as the information contained therein, such as the source, may be compromised. For example, a Type II threat report may contain false information, such as reporting a security threat when none existed, in an attempt to have the on-board threat defense module 402 recognize a legitimate file as a security threat, wherein the source of such file will be considered a security threat. As an example, a third party may access the vehicle's on-board security system 104 with a mobile device via the vehicle's WiFi hotspot to launch a denial-of-service attack. The third party may access the on-board computer system using an alias or false information to impersonate another entity, device, or source. The vehicle would then generate a Type II threat report using the false information to identify the source, rather than the actual source. As a result, the impersonated source will be considered a security threat, rather than the actual source.

In an example embodiment, a Type II threat report is transmitted from the on-board defense module 402 to the threat detection logic 704, wherein the threat report identifies that a specified source 740 is responsible for a security threat to the vehicle. The threat detection logic 704 in conjunction with the Trusted Virtual Vehicle logic 712 will activate a plurality of Trusted Virtual Vehicles and will instruct the Trusted Virtual Vehicles to communicate with the specified source 740 over a predefined time period as will be discussed in detail in connection with FIG. 10. If any of the Trusted Virtual Vehicles detects a security threat from the specified source 740, such Trusted Virtual Vehicle will transmit a Type II threat report to the threat detection logic 704 as would an actual vehicle. If one or more of the Trusted Virtual Vehicles transmits a Type II threat report to the threat detection logic 704 identifying the source as an attack source, then the source will suitably be considered a security threat, and the threat-related information maintained by the Security Cloud 110 and the on-board threat defense module 402 will be updated accordingly. If none of the Trusted Virtual Vehicles transmit a Type II threat report regarding the source, then the source will not be considered a security threat, and the threat-related information maintained by the Security Cloud 110 and the on-board threat defense module 402 will be updated accordingly.

Figure 8:
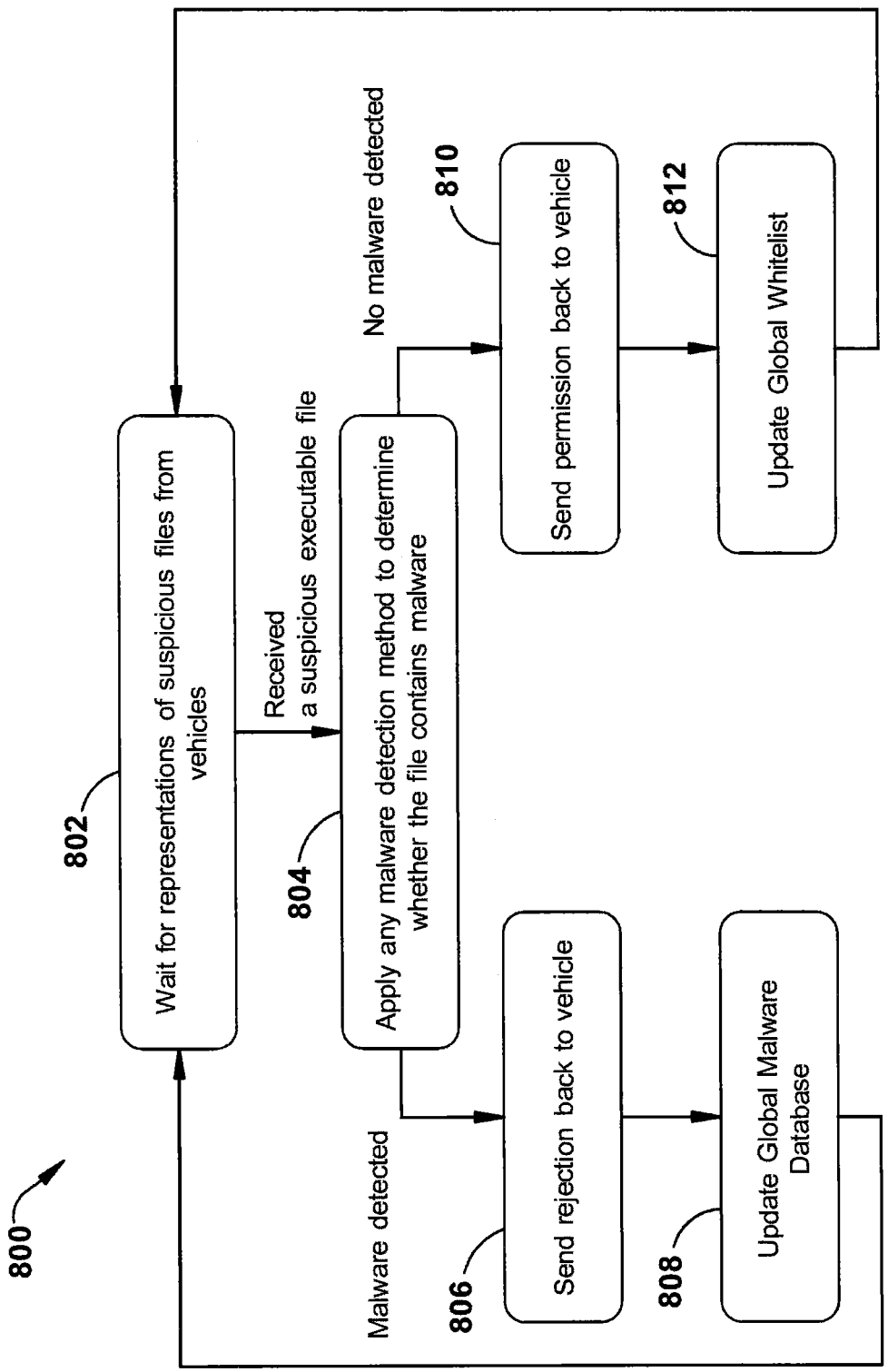
FIG. 8 illustrates an example methodology for detecting and protecting against security threats by a Security Cloud.

FIG. 8 is a flow chart of an example method 800 for analyzing files received by the threat detection logic 704 to determine if a file poses a security threat to the vehicle 102 as described herein. Method 800 may suitably be implemented on a system for cloud-assisted threat defense as described herein.

At 802, data representative of a file suspected of posing a security threat to the vehicle 102 is received at the threat detection logic 704 from the on-board threat defense module 402. The on-board threat defense module 402 will transmit data resulting from a determination by the file-examination logic 506 that information about the suspected file is not maintained by the on-board threat defense module 402, data generated by the threat reporting logic 512 regarding the suspected file, and/or any other data generated by the on-board threat defense module 402 regarding the suspected file.

At 804, the threat detection logic 704 will examine the suspected file to determine if the file poses a security threat to the vehicle 102 by any suitable process, system, algorithm, or the like as is known in the art, and as discussed above. In an example embodiment, the threat detection logic 704 will inspect the global whitelist database 706 and/or the global threat database 708 to determine if data about a file is contained therein. In another example, if the threat detection logic 704 determines that neither the global whitelist database 706 nor the global threat database 708 contain data related to a specified file, the threat detection logic 704 will suitably examine the file to determine whether the file contains malware or any other security threat as is known in the art.

If the threat detection logic 704 determines that the file poses a security threat, flow proceeds to 806, wherein the threat detection logic 704 will transmit data representative of such determination to the on-board threat defense module 402, which will, in response thereto, prevent the file from executing. At 808, the threat detection logic 704 updates the global threat database 708 accordingly.

If the threat detection logic 704 determines that the file does not pose a security threat, flow proceeds to 810, the threat detection logic 704 will transmit the results thereof to the on-board threat defense module 402, which will, in response thereto, allow the file to execute. At 812, the threat detection logic 704 updates the global whitelist database 706 accordingly.

Figure 9:
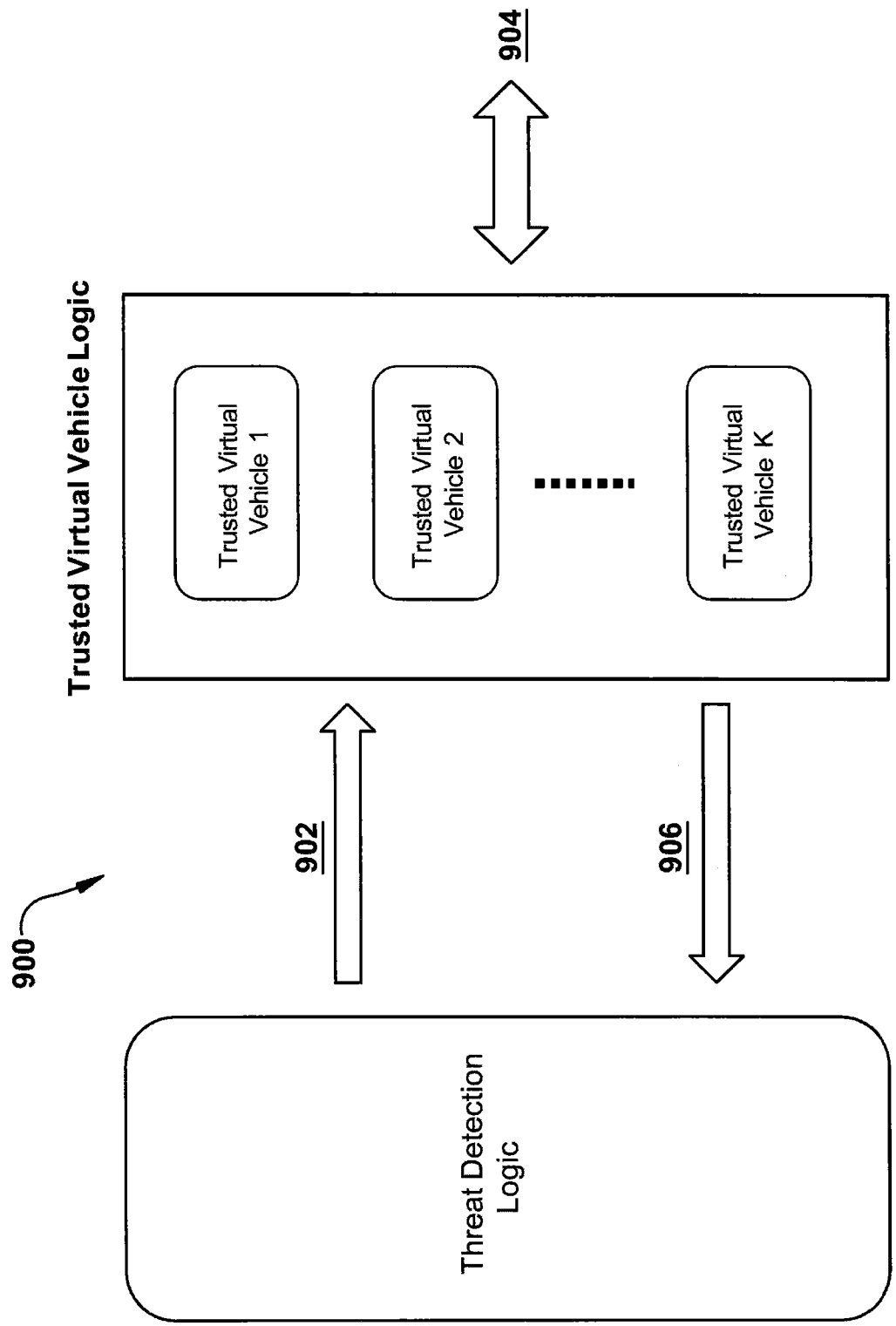
FIG. 9 illustrates an example methodology for using Trusted Virtual Vehicles to detect security threats.

FIG. 9 is a flow diagram of an example method 900 for illustrating the use of Trusted Virtual Vehicles to detect security threats to the vehicle 102. Method 900 may suitably be implemented on a system for cloud-assisted threat defense as described herein.

At 902, the threat detection logic 704 in conjunction with the Trusted Virtual Vehicle logic 712 activates a plurality of Trusted Virtual Vehicles, wherein each activated Trusted Virtual Vehicle may have a specified configuration and/or instructions for interacting with external networks, systems, and device.

At 904, the Trusted Virtual Vehicles communicate with a specified source 740, for example, external networks, systems, and devices, as an actual vehicle would. In an example embodiment, the Trusted Virtual Vehicles, in conjunction with the Trusted Virtual Vehicle logic 712 and/or the threat detection logic 704, will inspect files received at the Trusted Virtual Vehicles to determine if such files pose a security threat, as discussed in detail above.

At 906, the Trusted Virtual Vehicle logic 712 will transmit data regarding any files that pose a security threat as detected by the Trusted Virtual Vehicles to the threat detection logic 704 in any suitable format, such as a threat report. The threat detection logic 704 will then further examine or process such received data accordingly as discussed in detail above.

Figure 10:
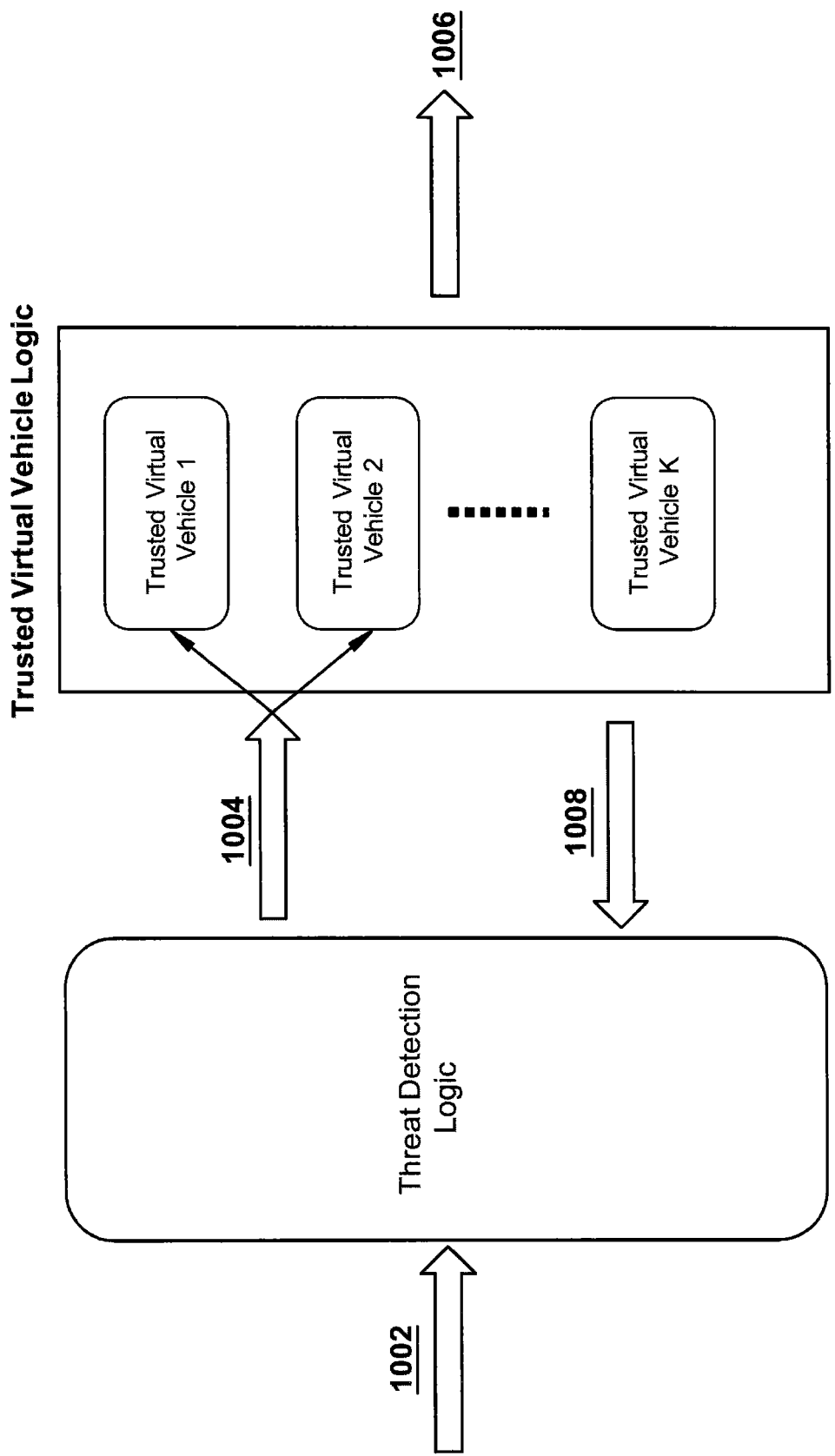
FIG. 10 illustrates an example methodology for using Trusted Virtual Vehicles to determine the trustworthiness of threat reports from a vehicle.

FIG. 10 is a flow diagram of an example method 1000 for illustrating the use of Trusted Virtual Vehicles to determine the trustworthiness of Type II threat reports received from the vehicle 102. Method 1000 may suitably be implemented on a system for cloud-assisted threat defense as described herein.

At 1002, a Type II threat report is transmitted from the on-board defense module 402 to the threat detection logic 704, wherein the threat report identifies that a specified source is responsible for a security threat to the vehicle.

At 1004, the threat detection logic 704 in conjunction with the Trusted Virtual Vehicle logic 712 activates a plurality of Trusted Virtual Vehicles and instructs the Trusted Virtual Vehicles to communicate with the specified source 740 over a predefined time period.

At 1006, the Trusted Virtual Vehicles communicate with the specified source 740 as directed by the threat detection logic 704. In an example embodiment, the Trusted Virtual Vehicles inspects files or other data received from the specified source 740 to determine if such files pose a security threat, as discussed in detail above. If a Trusted Virtual Vehicle detects a security threat from the specified source 740, the Trusted Vehicle will generate a Type II threat report. If a Trusted Virtual Vehicle does not detect any security threats during communications with the specified source 740, the Trusted Virtual Vehicle will not generate a Type II threat report regarding the specified source 740.

At 1008, the Trusted Virtual Vehicle logic 712 transmits any Type II threat reports generated by any Trusted Virtual Vehicles to the threat detection logic 704. The threat detection logic 704 will then further examine or process such received data accordingly.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A system comprising:
a non-transient memory disposed on an associated motor vehicle and configured to store data representative of security threats related to the associated motor vehicle;
an interface operable to communicate with the associated motor vehicle and at least one source external to the associated motor vehicle; and
control logic coupled with the interface and with the memory;
wherein the control logic is operable to receive data from at least one on-board unit of the associated motor vehicle and the at least one source external to the associated motor vehicle, wherein the received data includes data representative of at least one file identified for operation on the associated motor vehicle;
wherein the control logic is operable to determine whether at least one predefined characteristic exists with respect to the file;
wherein, in response to a determination that at least one predefined characteristic exists with respect to the file and that data associated with the file is located in the memory, the control logic is operable to determine whether the file includes a security threat by analyzing the file based on the data representative of security threats stored in the memory;
wherein, in response to a determination that the data associated with the file is not located in the memory, the control logic is operable to (i) transmit data related to the file to a cloud-based component communicatively coupled to the control logic via the interface, wherein the cloud-based component is configured to store the data representative of security threats and (ii) receive a threat assessment from the cloud-based component regarding the file; and
wherein the control logic is operable to generate a signal based on at least one of determining whether the file includes the security threat and analyzing the threat assessment.

2. The system as set forth in claim 1,
wherein the control logic is operable to, responsive to a determination that the file does not include the security threat, generate a first signal to allow the file to execute on the associated motor vehicle; and
wherein the control logic is operable to, responsive to a determination that the file includes the security threat, generate a second signal to prevent the file from executing on the associated motor vehicle.

3. The system as set forth in claim 1, wherein: the control logic is operable to determine, as to the at least one predefined characteristic, whether the file is to be transmitted to a secure network of the associated motor vehicle, the file is an executable file, or the file is a non-executable file that attempts to execute on the associated motor vehicle.

4. The system as set forth in claim 1,
wherein the control logic is operable to update the memory using results of determining whether the file includes the security threat based on the threat assessment received from the cloud-based component; and
wherein the control logic is operable to update the cloud-based component using results of determining whether the file includes the security threat by analyzing the file based on the data representative of security threats stored in the memory.

5. The system as set forth in claim 1, wherein the control logic is operable to dynamically adjust the size of a local database in the memory based on computational needs of an on-board computing device in the associated motor vehicle operable to access the memory, wherein the local database comprises the data representative of security threats.

6. The system as set forth in claim 5, wherein the control logic is operable to dynamically adjust the size of the local database by balancing the computational needs of the on-board computing device with a volume of network traffic between the control logic disposed on the associated motor vehicle and the cloud-based component.

7. A method comprising:
operating control logic, coupled with an associated memory disposed in an associated motor vehicle, to communicate with at least one on-board unit of the associated motor vehicle and at least one source external to the associated motor vehicle;

receiving data from the at least one on-board unit of the associated motor vehicle and the at least one source external to the associated motor vehicle, wherein the received data includes data representative of at least one file for operation on the associated motor vehicle;

determining by the control logic whether at least one predefined characteristic exists with respect to the file;

upon determining data associated with the file is in the memory, determining by the control logic whether the file includes a security threat by analyzing the file based on data representative of security threats stored in the memory in response to determining that at least one predefined characteristic exists with respect to the file;

upon determining the data associated with the file is not located in the memory, transmitting data related to the file to a cloud-based component external to the associated motor vehicle, wherein the cloud-based component is configured to store data representative of security threats related to the associated motor vehicle;

receiving a threat assessment from the cloud-based component regarding the file; and generating by the control logic a signal based on at least one of determining whether the file includes the security threat and analyzing the threat assessment.

8. The method as set forth in claim 7, further comprising:
responsive to a determination that the file does not include the security threat, generating by the control logic a first signal indicating that the file be allowed to execute on the associated motor vehicle; and
responsive to a determination that the file includes the security threat, generating by the control logic a second signal indicating that the file be prevented from executing on the associated motor vehicle.

9. The method as set forth in claim 7, wherein the file is analyzed if the file is at least one of a file that is to be transmitted to a secure network of the associated motor vehicle, an executable file, or a non-executable file that attempts to execute on the associated motor vehicle.

10. The method as set forth in claim 7, further comprising:
updating by the control logic the memory disposed on the associated motor vehicle in response to a determination of whether the file includes the security threat based on the threat assessment received from the cloud-based component; and
updating by the control logic the cloud-based component in response to the determination of whether the file includes the security threat by analyzing the file based on the data representative of security threats stored in the memory.

11. The method of claim 7, further comprising:
dynamically adjusting the size of a local database in the memory based on computational needs of an on-board computing device in the associated motor vehicle that accesses the memory, wherein the local database comprises the data representative of security threats stored in the memory.

12. The method of claim 11, wherein dynamically adjusting the size of the local database comprises balancing the computational needs of the on-board computing device with a volume of network traffic between the associated motor vehicle and the cloud-based component.

13. Logic encoded in at least one non-transitory computer readable media for execution by a processor, and when executed by the processor operable to:

operate control logic, coupled to an associated memory disposed in an associated motor vehicle, to communicate with at least one on-board unit of the associated motor vehicle and at least one source external to the associated motor vehicle;

receive data from at least one on-board unit of an associated motor vehicle and at least one source external to the associated motor vehicle, wherein the received data includes data representative of a file for operation on the associated motor vehicle;

determine by the control logic whether at least one predefined characteristic exists with respect to the file;

upon determining data associated with the file is in the memory, determine by the control logic whether the file includes a security threat by analyzing the file based on data representative of security threats stored in the memory in response to determining that at least one predefined characteristic exists with respect to the file;

upon determining the data associated with the file is not located in the memory, transmit data related to the file to a cloud-based component external to the associated motor vehicle, wherein the cloud-based component is configured to store data representative of security threats related to the associated motor vehicle;

receiving a threat assessment from the cloud-based component regarding the file; and generate by the control logic a signal based on at least one of determining whether the file includes the security threat and analyzing the threat assessment.

14. The logic as set forth in claim 13, further operable to:
responsive to a determination that the file does not include the security threat, generate by the control logic a first signal indicating that the file be allowed to execute on the associated motor vehicle; and
responsive to a determination that the file includes the security threat, generate by the control logic a second signal indicating that the file be prevented from executing on the associated motor vehicle.

15. The logic as set forth in claim 13, wherein the logic is operable to analyze the file if the file is at least one of a file that is to be transmitted to a secure network of the associated motor vehicle, an executable file, or a non-executable file that attempts to execute on the associated motor vehicle.

16. The logic as set forth in claim 13, further operable to:
updating by the control logic the memory disposed on the associated motor vehicle in response to a determination of whether the file includes the security threat based on the threat assessment received from the cloud-based component; and
updating by the control logic the cloud-based component in response to the determination of whether the file includes the security threat by analyzing the file based on the data representative of security threats stored in the memory.

17. A method comprising:
operating control logic, coupled with an associated memory disposed in an associated motor vehicle, to communicate with at least one on-board unit of the associated motor vehicle and at least one source external to the associated motor vehicle;

receiving data from the at least one on-board unit of the associated motor vehicle and the at least one source external to the associated motor vehicle, wherein the received data includes data representative of at least two files for operation on the associated motor vehicle;

determining by the control logic whether at least one predefined characteristic exists with respect to the at least two files;

upon determining the data associated with a first file of the two files is in the memory, determining by the control logic whether the first file includes a security threat by analyzing the first file based on data representative of security threats stored in the memory in response to determining that at least one predefined characteristic exists with respect to the first file;

upon determining the data associated with a second file of the two files is not located in the memory, transmitting data related to the second file to a cloud-based component external to the associated motor vehicle, wherein the cloud-based component is configured to store data representative of security threats related to the associated motor vehicle;

receiving a threat assessment from the cloud-based component regarding the second file; and generating by the control logic a signal based on at least one of determining whether the first file includes the security threat and analyzing the threat assessment.

18. Logic encoded in at least one non-transitory computer readable media for execution by a processor, and when executed by the processor operable to:

operate control logic, coupled to an associated memory disposed in an associated motor vehicle, to communicate with at least one on-board unit of the associated motor vehicle and at least one source external to the associated motor vehicle;

receive data from at least one on-board unit of an associated motor vehicle and at least one source external to the associated motor vehicle, wherein the received data includes data representative of at least two files for operation on the associated motor vehicle;

determine by the control logic whether at least one predefined characteristic exists with respect to the files;

upon determining the data associated with a first file of the files is in the memory, determine by the control logic whether the first file includes a security threat by analyzing the first file based on data representative of security threats stored in the memory in response to determining that at least one predefined characteristic exists with respect to the first file;

upon determining the data associated with a second file of the files is not located in the memory, transmit data related to the second file to a cloud-based component external to the associated motor vehicle, wherein the cloud-based component is configured to store data representative of security threats related to the associated motor vehicle;

receive a threat assessment from the cloud-based component regarding the second file; and generate by the control logic a signal based on at least one of determining whether the first file includes the security threat and analyzing the threat assessment.

* * * * *